(12) United States Patent
Asterjadhi et al.

(10) Patent No.: US 10,135,957 B2
(45) Date of Patent: Nov. 20, 2018

(54) METHODS AND APPARATUS FOR COMMUNICATING HIGH EFFICIENCY CONTROL INFORMATION

(71) Applicant: QUALCOMM Incorporated, San Diego, CA (US)

(72) Inventors: Alfred Asterjadhi, San Diego, CA (US); Simone Merlin, San Diego, CA (US); George Cherian, San Diego, CA (US); Gwendolyn Denise Barriac, Encinitas, CA (US); Gang Ding, San Diego, CA (US); Qingjiang Tian, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 15/181,364

(22) Filed: Jun. 13, 2016

(65) Prior Publication Data
US 2016/0366254 A1 Dec. 15, 2016

Related U.S. Application Data

(60) Provisional application No. 62/175,620, filed on Jun. 15, 2015, provisional application No. 62/190,220, (Continued)

(51) Int. Cl.
*H04L 29/08* (2006.01)
*H04L 5/00* (2006.01)

(52) U.S. Cl.
CPC .......... *H04L 69/324* (2013.01); *H04L 5/0053* (2013.01); *H04L 5/0091* (2013.01); *H04L 5/0055* (2013.01); *H04L 5/0094* (2013.01)

(58) Field of Classification Search
CPC ....... H04L 29/08; H04L 5/0007; H04W 84/12
See application file for complete search history.

(56) References Cited

U.S. PATENT DOCUMENTS

2003/0198244 A1* 10/2003 Ho .................. H04W 74/06
370/442
2011/0255620 A1 10/2011 Jones, IV
(Continued)

FOREIGN PATENT DOCUMENTS

EP 1562334 A2 8/2005
WO WO-2008073024 A1 6/2008
(Continued)

OTHER PUBLICATIONS

International Search Report and Written Opinion—PCT/US2016/037409—ISA/EPO—Dec. 8, 2016.
(Continued)

*Primary Examiner* — Jamal Javaid
(74) *Attorney, Agent, or Firm* — Knobbe, Martens, Olson & Bear, LLP

(57) ABSTRACT

Methods, devices, and computer program products for traffic information signaling in a wireless communications network are disclosed. In one aspect, a method of wireless communication network is disclosed. The method includes selecting, from a variable number of control fields, one or more control fields for inclusion in a frame. The method further includes generating the frame comprising the selected number of control fields, each control field comprising an end of control field, the end of control field storing an indicator indicative of an end of the selected number of control fields or a presence of another control field in the frame. The method further includes transmitting the frame.

49 Claims, 22 Drawing Sheets

Related U.S. Application Data filed on Jul. 8, 2015, provisional application No. 62/209,184, filed on Aug. 24, 2015, provisional application No. 62/260,176, filed on Nov. 25, 2015, provisional application No. 62/264,153, filed on Dec. 7, 2015, provisional application No. 62/278,342, filed on Jan. 13, 2016, provisional application No. 62/305,978, filed on Mar. 9, 2016.

(56) References Cited

U.S. PATENT DOCUMENTS

| | | | |
|---|---|---|---|
| 2013/0170345 A1 | 7/2013 | Merlin et al. | |
| 2013/0223210 A1 | 8/2013 | Asterjadhi et al. | |
| 2013/0336182 A1 | 12/2013 | Asterjadhi et al. | |
| 2014/0071873 A1* | 3/2014 | Wang | H04W 74/08 370/311 |
| 2014/0307612 A1* | 10/2014 | Vermani | H04L 5/0044 370/312 |
| 2014/0341234 A1 | 11/2014 | Asterjadhi et al. | |
| 2015/0063190 A1 | 3/2015 | Merlin et al. | |
| 2015/0110046 A1 | 4/2015 | Merlin et al. | |
| 2015/0139119 A1 | 5/2015 | Azizi et al. | |
| 2015/0327121 A1* | 11/2015 | Li | H04L 5/0055 370/328 |

FOREIGN PATENT DOCUMENTS

| | | |
|---|---|---|
| WO | WO-2012173326 A1 | 12/2012 |
| WO | WO-2013009775 A2 | 1/2013 |

OTHER PUBLICATIONS

Madhavan N., "Reducing Channel Sounding Protocol Overhead for 11ax, 11-15-1097-01-00ax-Reducing-Channel-Sounding-Protocol-Overhead-for-11ax", IEEE Draft, 11-15-1097-01-00AX-Reducing-Channel-Sounding-Protocol-Overhead-for-11AX, IEEE-SA Mentor, Piscataway, NJ, USA, vol. 802, 11ax, No. 1, Sep. 15, 2015 (Sep. 15, 2015), pp. 1-16, XP068098331, [retrieved on Sep. 15, 2015].
Partial International Search Report—PCT/US2016/037409—ISA/EPO—Aug. 23, 2016.
Ryu K., "UL MU Procedure; 11-15-0365-00-00ax-ul-mu-procedure", IEEE Draft; 11-15-0365-00-00AX-UL-MU-Procedure, IEEE-SA Mentor, Piscataway, NJ USA, vol. 802.11ax, Mar. 9, 2015 (Mar. 9, 2015), pp. 1-16, XP068083020, [retrieved on Mar. 9, 2015].

\* cited by examiner

| Ctrl ID | Control Info field (size) | Description |
|---|---|---|
| 0/1 | Ack / Nack (0) | Indicates successful/failed RX of immediately preceding MPDU |
| 2 | BAR (4) | Indicates a block ack request |
| 3 | BA (4-130) | Indicates receive status of previously received MPDUs |
| 4 | CQI/MCS Feedback (variable) | Indicates channel quality information/MCS feedback |
| 5 | E-PS Poll (?) | Indicates a power save poll that includes UL buffer status report - Temporary AID (pre-association AID) |
| 6-29 | ... | |
| 30 | Extension | Reserved for future extension |
| 31 | CRC (1) | Indicates a CRC-based protection of the preceding fields of the MAC header |

FIG. 8A

| Control ID | Control Information {Octets} | Description |
|---|---|---|
| 0 | Ack {0} | Indicates an Ack (successful RX of immediately preceding MPDU) |
| 1 | BAR {4} | Indicates a Block Ack Request (request for a block ack) |
| 2 | BA {4-130} | Indicates a Block Ack (receive status of previously received MPDUs) |
| 3 | QoS Control {2} | Indicates buffer status request/report (enhanced version of QoS Control) |
| 4 | HT Control {4} | Indicates channel quality information/MCS feedback (enhanced version of HT Control) |
| 5 | Unicast Trigger {TBD} | Indicates a Trigger (resource allocation and other parameters for UL) |
| 6-29 | ... | TBD |
| 31 | Extension | Reserved for future extension |

FIG. 8B

| Control ID value | Meaning | Control Information subfield |
|---|---|---|
| 0 | UL MU response scheduling | contains scheduling information for an UL MU PPDU carrying immediate acknowledgement that is expected as a response to the soliciting A-MPDU |
| 1 | Receive operation mode indication | contains information related to the receive operation mode of the STA transmitting the MPDU containing this HE Control field |
| TBD | ... | |
| Last | Extension (currently reserved) | |

FIG. 20

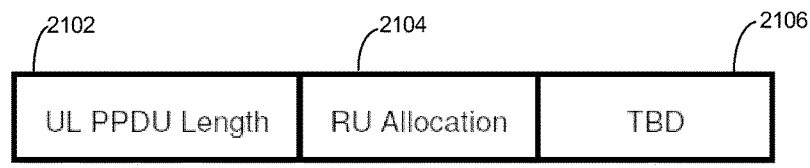

FIG. 21A

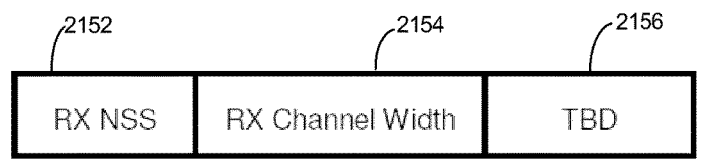

FIG. 21B

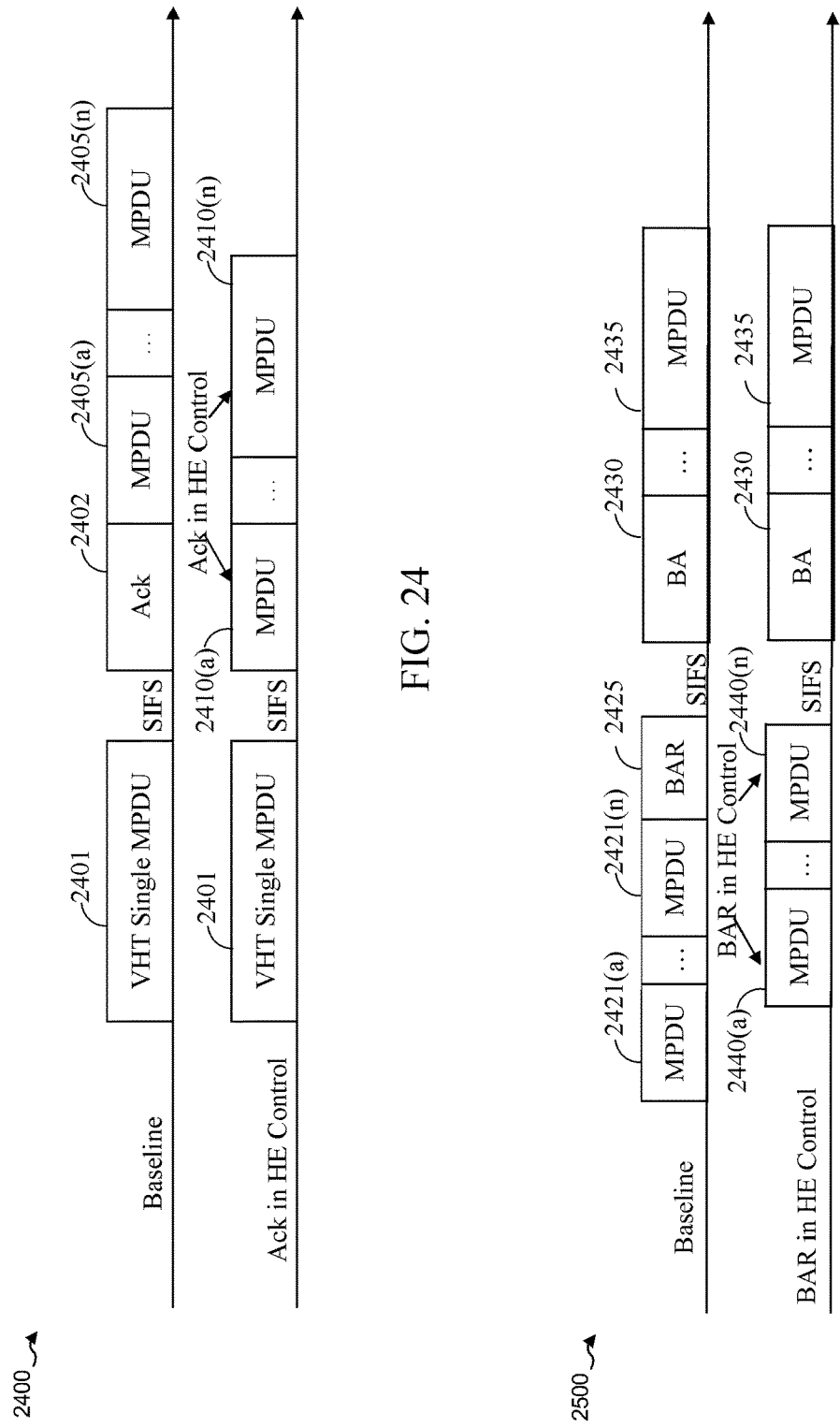

METHODS AND APPARATUS FOR COMMUNICATING HIGH EFFICIENCY CONTROL INFORMATION

CROSS REFERENCE TO RELATED APPLICATIONS

This application claims priority benefit under 35 U.S.C. § 119(e) to U.S. Provisional Patent Application No. 62/175,620 entitled "METHODS AND APPARATUS FOR COMMUNICATING HIGH EFFICIENCY CONTROL INFORMATION" filed on Jun. 15, 2015, Provisional Patent Application No. 62/190,220 entitled "METHODS AND APPARATUS FOR COMMUNICATING HIGH EFFICIENCY CONTROL INFORMATION" filed on Jul. 8, 2015, Provisional Patent Application No. 62/209,184 entitled "METHODS AND APPARATUS FOR COMMUNICATING HIGH EFFICIENCY CONTROL INFORMATION" filed on Aug. 24, 2015, Provisional Patent Application No. 62/260,176 entitled "METHODS AND APPARATUS FOR COMMUNICATING HIGH EFFICIENCY CONTROL INFORMATION" filed on Nov. 25, 2015, Provisional Patent Application No. 62/264,153 entitled "METHODS AND APPARATUS FOR COMMUNICATING HIGH EFFICIENCY CONTROL INFORMATION" filed on Dec. 7, 2015, Provisional Patent Application No. 62/278,342 entitled "METHODS AND APPARATUS FOR COMMUNICATING HIGH EFFICIENCY CONTROL INFORMATION" filed on Jan. 13, 2016, Provisional Patent Application No. 62/305,978 entitled "METHODS AND APPARATUS FOR COMMUNICATING HIGH EFFICIENCY CONTROL INFORMATION" filed on Mar. 9, 2016, the disclosure of each is hereby incorporated by reference in its entirety.

FIELD

The present application relates generally to wireless communications, and more specifically to systems, methods, and devices for communicating control information.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. In some aspects, devices may transmit control information in order to better facilitate communication between the devices. However, in some aspects, such information may increase overhead and reduce efficiency. Accordingly, there is a need for improved methods and devices for communicating such information between devices.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention allow for efficient use of the wireless communication medium.

In one aspect, a method of wireless communication is disclosed. The method includes selecting, from a variable number of control fields, one or more control fields for inclusion in a frame. The method further includes generating the frame comprising the selected number of control fields, each control field comprising an end of control field, the end of control field storing an indicator indicative of an end of the selected number of control fields or a presence of another control field in the frame. The method further includes transmitting the frame.

In another aspect, a wireless device for communicating in a wireless network is provided. The wireless device includes a processor configured to select, from a variable number of control fields, one or more control fields for inclusion in a frame, the processor further configured to generate the frame comprising the selected number of control fields, each control field comprising an end of control field, the end of control field storing an indicator indicative of an end of the selected number of control fields or a presence of another control field in the frame. The wireless device further includes a transmitter configured to transmit the frame.

Some aspects of the present disclosure relate to a wireless device for communicating in a wireless network is provided. The wireless device includes means for selecting, from a variable number of control fields, one or more control fields for inclusion in a frame. The wireless device further includes means for generating the frame comprising the selected number of control fields, each control field comprising an end of control field, the end of control field storing an indicator indicative of an end of the selected number of control fields or a presence of another control field in the frame. The wireless device further includes means for transmitting the frame.

Another aspect of the present disclosure relates to a non-transitory computer storage that stores executable program instructions that direct a wireless communications device to perform a method that includes selecting, from a variable number of control fields, one or more control fields for inclusion in a frame. The method further includes transmitting the frame.

BRIEF DESCRIPTION OF THE DRAWINGS

FIG. 8A is a chart of exemplary values of the control ID field of the HE control field.

FIG. 8B is a chart of exemplary values of the control ID field of the short form HE control field.

FIG. 20 is a chart of other exemplary values of the control ID field and the control information field.

FIG. 21A is a diagram of an exemplary format of the control information field, in accordance with an embodiment.

FIG. 21B is a diagram of an exemplary format of the control information field, in accordance with an embodiment.

FIG. 24 is an exemplary frame exchange between devices including an acknowledgement (ACK) message.

FIG. 25 is an exemplary frame exchange between devices including an block acknowledgement request (BAR) message.

DETAILED DESCRIPTION

Figure 1:
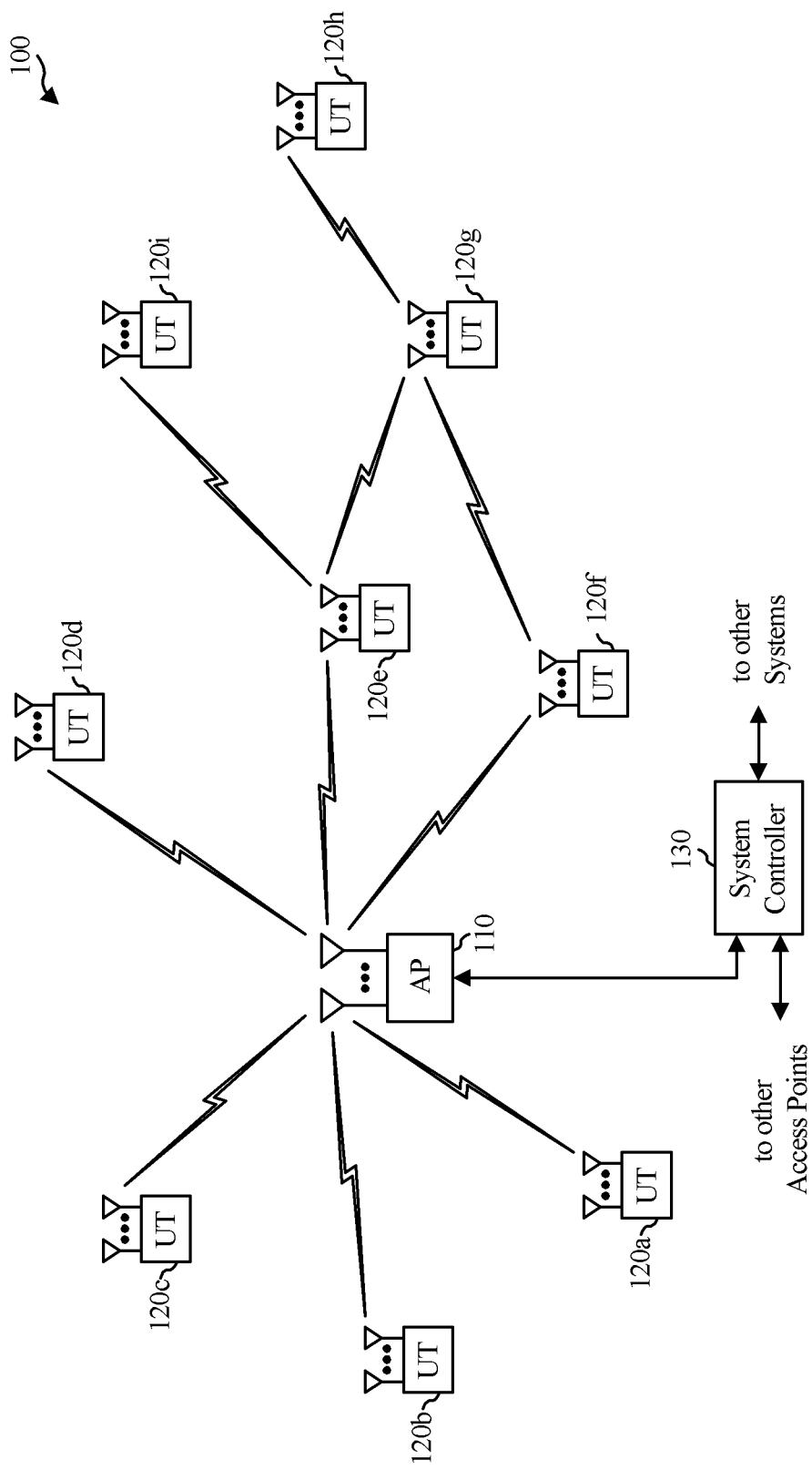
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosed may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes.

In some implementations, a WLAN includes various devices which are the components that access the wireless network. For example, there may be two types of devices:

access points ("APs") and clients (also referred to as stations, commonly known as "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or using some other terminology. A user terminal or STA may be fixed or mobile and may also be referred to as a mobile station or a wireless device, or using some other terminology. The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \leq K \leq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
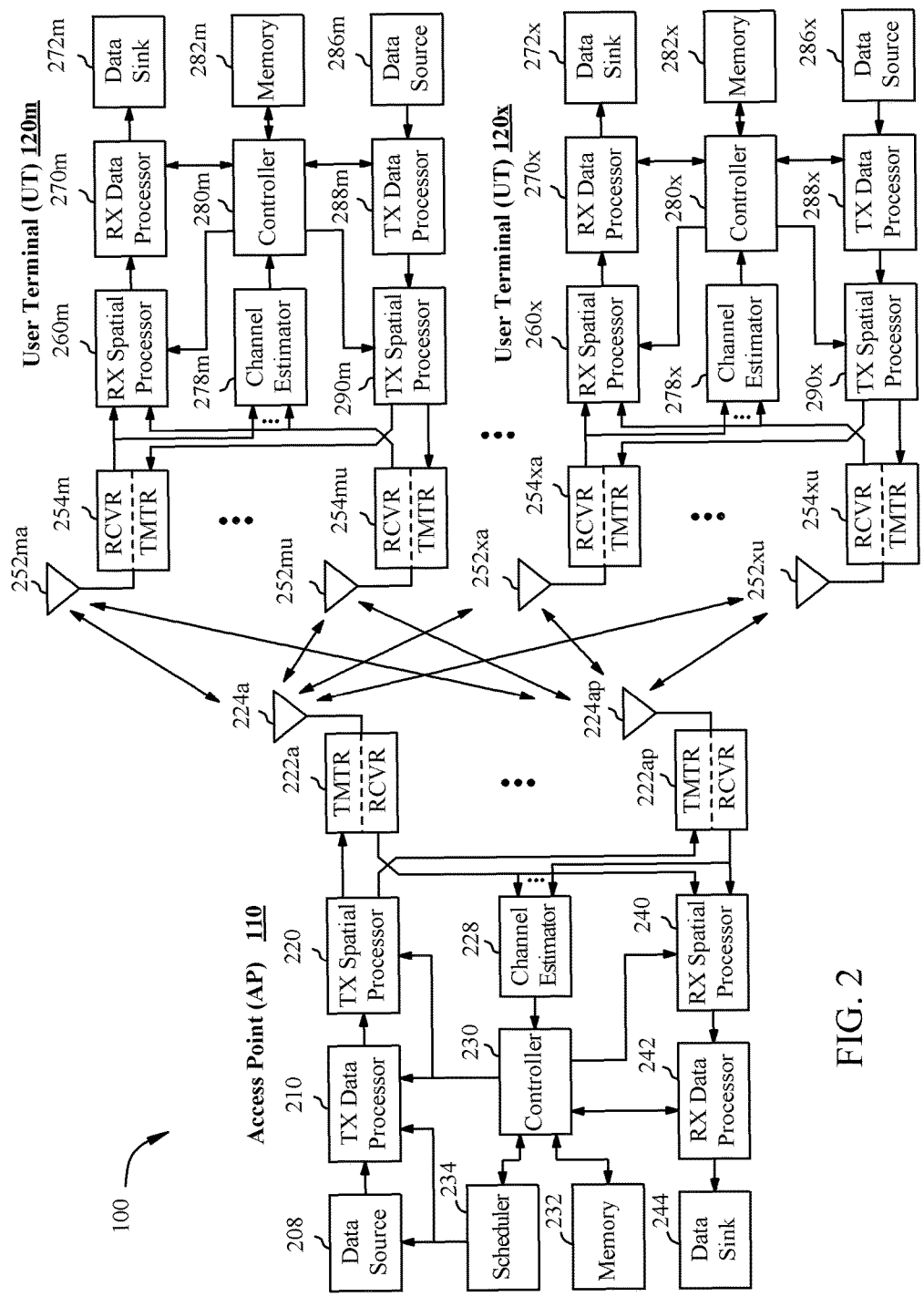
FIG. 2 illustrates a block diagram of the access point 110 and two user terminals 120*m* and 120*x* in a MIMO system.

FIG. 2 illustrates a block diagram of the access point 110 and two user terminals 120m and 120x in MIMO system 100. The access point 110 is equipped with $N_t$ antennas 224a through 224ap. The user terminal 120m is equipped with $N_{ut,m}$ antennas $252_{ma}$ through $252_{mu}$, and the user terminal 120x is equipped with $N_{ut,x}$ antennas $252_{xa}$ through $252_{xu}$. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{up}$ antennas 224a through $224_{ap}$ receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the user terminals 120.

At each user terminal 120, $N_{ut,m}$ antennas 252 receive the $N_{up}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
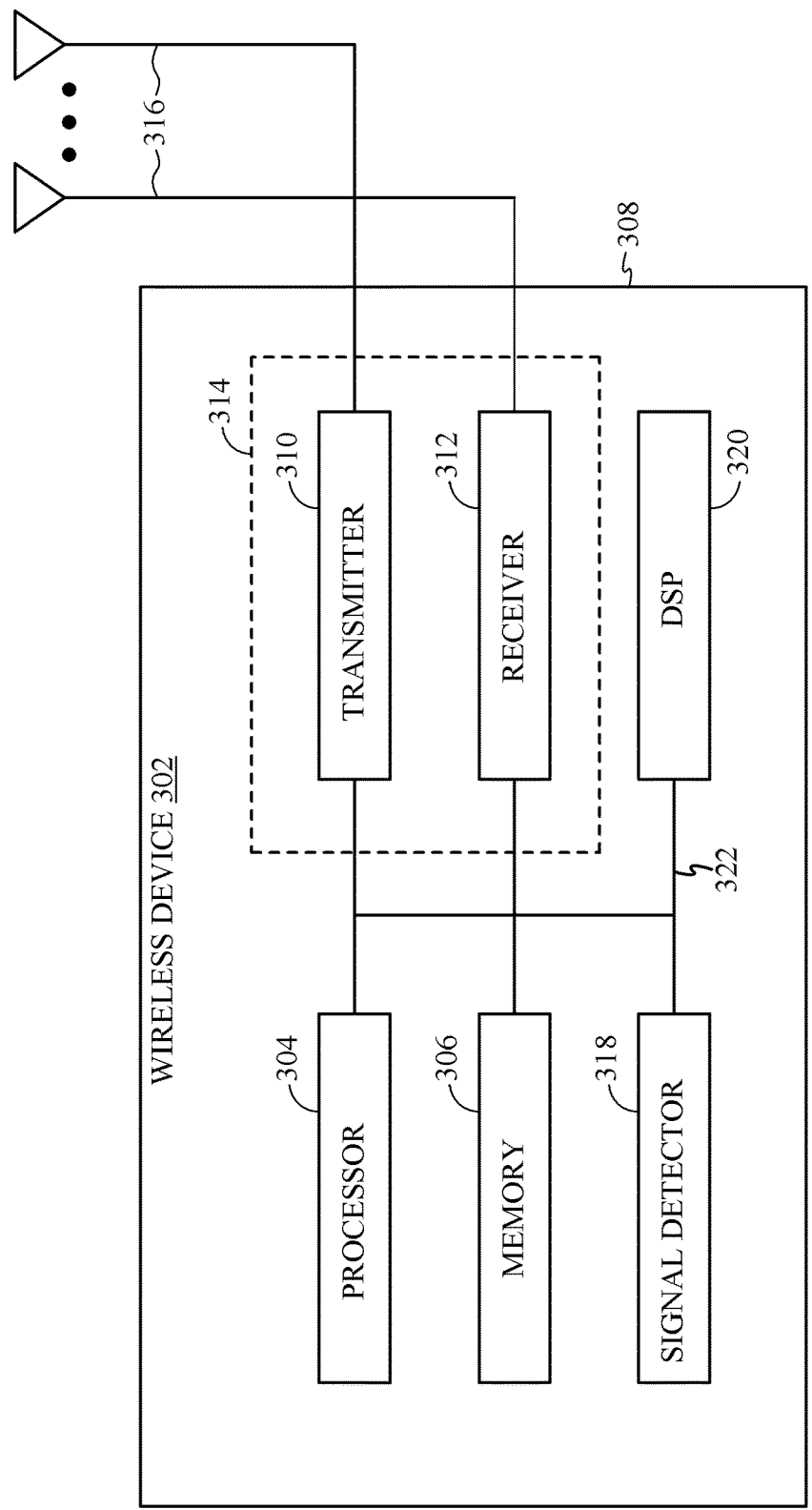
FIG. 3 illustrates various components that may be utilized in a wireless device that may be employed within a wireless communication system.

FIG. 3 illustrates various components that may be utilized in a wireless device 302 that may be employed within the wireless communication system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In some aspects, a wide range of control information may be exchanged between STAs and/or APs using an 802.11 protocol. For example, STAs may exchange buffer status (BS) feedback, channel quality information feedback, resource allocation, power save (PS) feedback, etc. in order to facilitate more efficient communication between wireless devices. This control information may be required to be signaled somewhere within exchanged frames between the STAs and/or APs. In some aspects, including this information in various containers (e.g., frames, element, fields) may add to design complexity. Additionally, including this control information in an aggregation of multiple types of frames (e.g., control, management, data, etc.) may increase medium access control (MAC) MAC overhead. Accordingly, it may be beneficial to define a new type of control field in a MAC frame in order to better exchange such control information. In such a new type of control field, the control field may comprise one or more control fields carrying a variety of control information in one or more MAC frames. In addition, the new type of control field may indicate the end of the one or more control frames and may be generated to include a variable amount of information in each control field.

Figure 4:
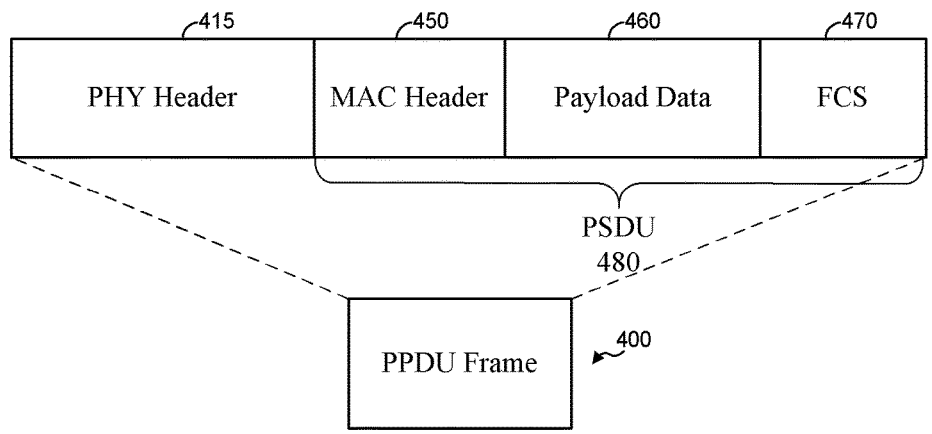
FIG. 4 shows a diagram of an exemplary physical layer convergence procedure (PLCP) protocol data unit (PPDU) frame.

FIG. 4 is a diagram illustrating an exemplary embodiment of a physical layer convergence procedure (PLCP) protocol data unit (PPDU) frame 400. As shown in FIG. 4, the PPDU frame 400 comprises a physical layer (PHY) header 415 and a PLCP service data unit (PSDU) 480 comprising a MAC header field 450, a payload data field 460, and a frame check sequence (FCS) field 470. The PSDU 480 may also be referred to as a payload portion 480 of the PPDU 400. The PHY header 415 may be used to acquire an incoming OFDM signal, to train and synchronize a demodulator, and may aid in demodulation and delivery of the payload portion 480.

Figure 5:
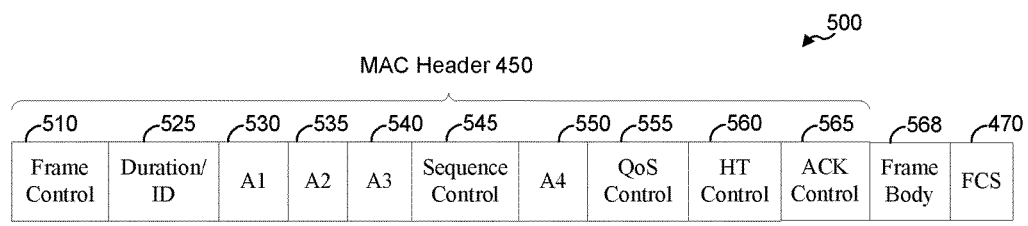
FIG. 5 shows a diagram of an medium access control (MAC) frame.

FIG. 5 is a diagram illustrating an exemplary embodiment of a media access control (MAC) frame 500. In some embodiments, the MAC frame 500 may comprise a media access control protocol data unit (MPDU) frame. In some embodiments, the MAC frame 500 may correspond to the payload portion 480, as previously described in connection with FIG. 4. As shown, the MAC frame 500 includes 12 different fields: a frame control (fc) field 510, a duration/identification (dur) field 525, a receiver address (a1) field 530, a transmitter address (a2) field 535, a destination address (a3) field 540, a sequence control (sc) field 545, a fourth address (a4) field 550, a quality of service (QoS) control (qc) field 555, a high throughput (HT)/very high throughput (VHT) control field 560, a frame body 568, and a frame check sequence (FCS) field 470. Some or all of the fields 510-565 may make up the MAC header 450 of FIG. 4. In some embodiments, a protocol version field of the frame control field 510 of the MAC frame 500 can be 0, or 1 or greater than 1.

Figure 6:
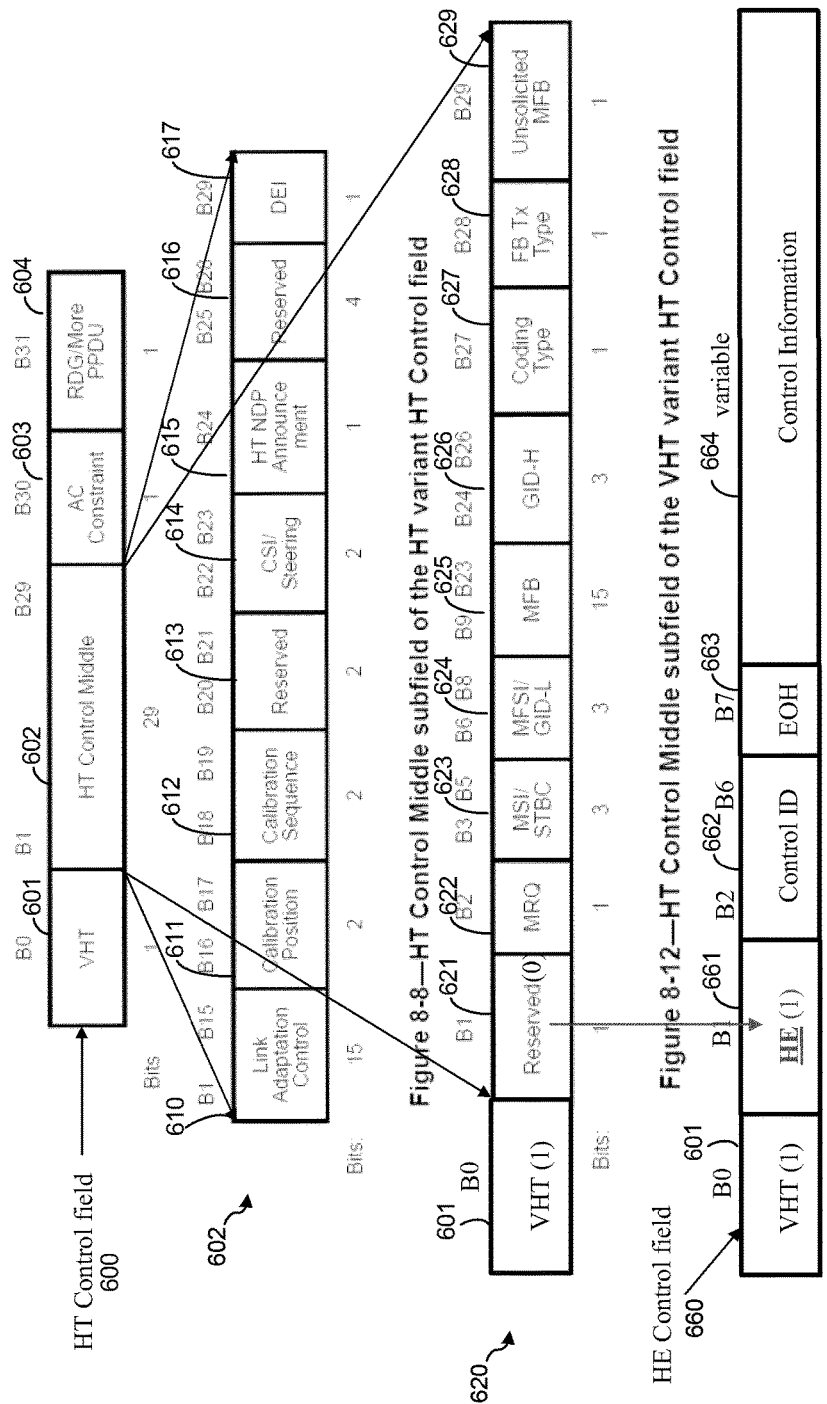
FIG. 6 is a diagram illustrating an exemplary embodiment of a high efficiency (HE) control field.

FIG. 6 is a diagram illustrating an exemplary embodiment of a high efficiency (HE) control field 660. The top of FIG. 6 shows an exemplary format of high throughput (HT) control field 600. In some embodiments, the HT control field may correspond to the HT/VHT control field 560 of FIG. 5. As shown in FIG. 6, the HT control field 600 comprises a very high throughput (VHT) field 601, a HT control middle field 602, an access category (AC) constraint field 603, and a reverse direction grant (RDG)/more physical layer convergence procedure protocol data unit (PPDU) field 604. Below the HT control field 600, is an expanded view of an exemplary format of the HT control middle field 602. In some aspects, the HT control middle field may comprise a link adaption control field 610, a calibration position field 611, a calibration sequence field 612, a first reserved field 613, a channel state information (CSI)/steering field 614, a HT null data packet (NDP) announcement field 615, a second reserved field 616, and a drop eligibility indicator (DEI) field 617.

Below the expanded HT control middle field 602 in FIG. 6, is a second expanded view of a second exemplary format 620 of the HT control middle field 602. In this embodiment, the VHT field 601 of the HT control field 600 is set to a value of 1 to indicate that HT control field 600 is configured in a VHT variant of the HT control field 600. As shown in FIG. 6, the HT control field format 620 comprises the VHT field 601, a reserved field 621, a modulation and coding scheme (MCS) request (MRQ) field 622, a MCS request sequence identifier (MSI)/space-time block coding (STBC) field 623, a MCS feedback sequence identifier (MFSI)/a group identifier lowest bits (GID-L) field 624, a MCS feedback (MFB) field 625, a GID highest bits (GID-H) field 626, a coding type field 627, a feedback transmitter (Tx) type field 628, and an unsolicited MFB field 629.

Below the second expanded HT control middle field 620 in FIG. 6, is an expanded view of an exemplary format of a HE control field 660. In this embodiment, the VHT field 601 of the HT control field 600 is set to a value of 1 and a second field or bit is set to 1 to indicate that the HE control field 660 is configured as a HE variant of the VHT variant of the HT control field 600. As shown in FIG. 6, the HE control field 660 comprises a HE indicator field 661, a control identifier (ID) field 662, an end of HE control (EOH) field 663, and a control information field 664. In some aspects, HE indicator field 661 comprises the second field discussed above or the reserved field 621 of FIG. 6 and is indicative of whether the HT control field 600 is configured as the HE variant of the VHT variant of the HT control field 600. For example, in some embodiments, if the HE indicator field 661 is set to 0 then the HT control field of the MAC frame 500 comprises the format of the HT control field 600. If the HE indicator field 661 is set to 1 then the HT control field of the MAC frame 500 comprises the HE control field 660. The control ID field 662 may comprise an indication of the content, type, and/or length of the information included in the control information field 664. In some embodiments, the control ID field 662 may comprise between 1-6 bits. The EOH field or end of control field 663, may store an indicator indicative of an end of a selected number of HE control fields 660 in the MAC frame (e.g., MAC frame 500 of FIG. 5) or a presence of another HE control field 660 in the MAC frame 500. In some embodiments, the EOH field 663 may comprise between 1-6 bits.

Figure 7A:
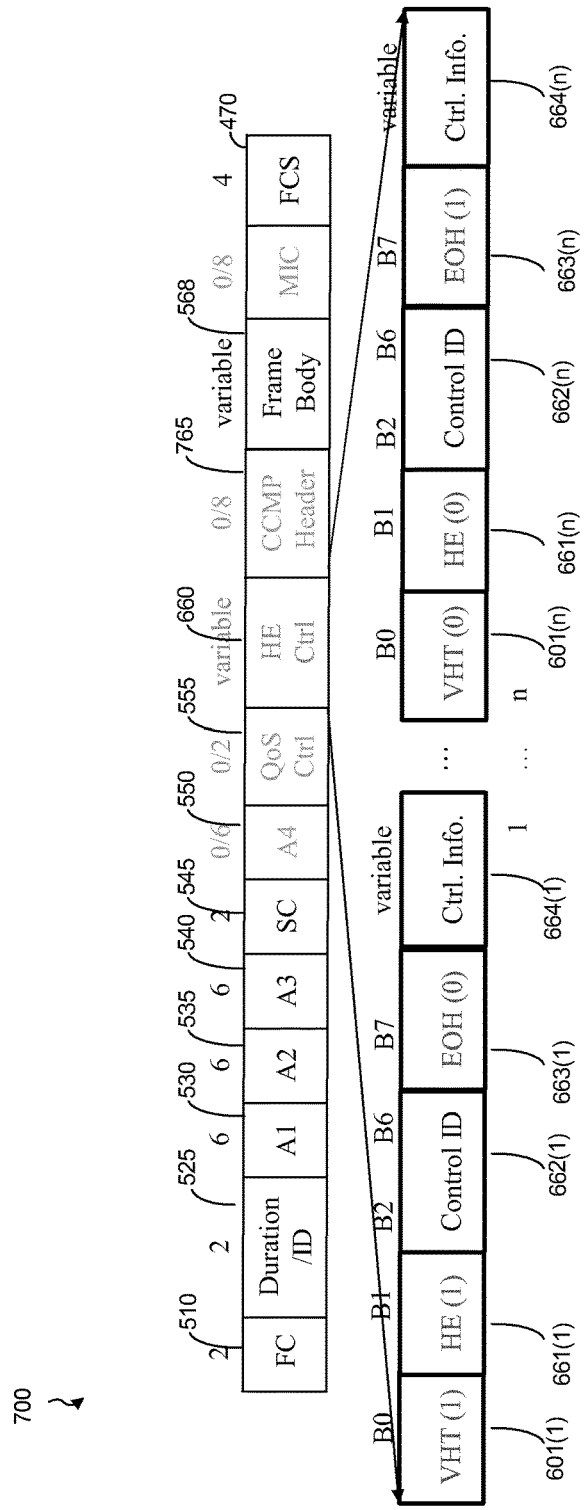
FIG. 7A is a diagram of an exemplary MAC frame comprising a HE control field which comprises multiple HE control fields.

For example, FIG. 7A is a diagram of an exemplary MAC frame 700 comprising a HE control field 660 which comprises multiple HE control fields 660. FIG. 7A is similar to and adapted from MAC frame 500 of FIG. 5. Only differences between the MAC frames 500 and 700 are described herein for the sake of brevity. As shown in FIG. 7A, HE control field 660 is located after the QoS control field 555 (if such field is present) may comprise a variable length depending on the number of HE control fields present and/or the type and/or amount of information included in the control information field 664 of each HE control field 660. In some aspects, the presence of the HE control field 660 may be indicated in an order field of a frame control (FC) field of a QoS MAC frame field 555 (i.e., a similar signaling that indicates the presence of an HT Control field). In some embodiments, the length of the HE control field 660 and/or the control information field 664 of each HE control field 660 may be limited to multiples of two or four bytes. As further shown in FIG. 7A, the HE control field 660 may comprise anywhere from 0 to n number of HE control fields 660, where n is an integer greater than or equal to 1. The HE control fields 660(1-n) may be concatenated one after the other in a manner similar to that shown in FIG. 7A. In some embodiments, the VHT field 601 and the HE indicator field 661 of the last n-1, HE control fields 660 may re-used and/or re-purposed to carry other information or signaling as their values may only be required for the first HE Control field to differentiate this first field from the HT Control field and the VHT variant of the HT control field. MAC frame 700 also comprises counter mode (CTR) with cipher-block chaining message authentication code (CBC-MAC) protocol (CCMP) header field 765. In some embodiments the one or more HE Control fields precede the CCMP/GCMP header field or (if when this field is absent) they precede the payload (e.g., frame body 568) of the MAC frame (e.g., MAC frame 500, 700). Some non-limiting benefits to the HE control field 660 in the MAC frame 700 include that the HE control field 660 format may be backward compatible in that it is a flexible variant of the existing HT Control field 600, the HE control field 660 format may also be forward compatible in that it may be expansible for future amendments, as discussed herein, the HE control field 660 may reduce overhead by avoiding aggregation of multiple frames in A-MPDUs, the HE control field 660 may increase flexibility it that it may deliver a wide range of feedback information that can be used by the peer STAs or an AP to improve efficiency, as well as providing other benefits.

In an exemplary embodiment, the MAC frame 700 may comprise five (5) concatenated HE control fields 660, the EOH field 663 may be set to a 0 value in the first four (4) HE control fields to indicate the presence of another HE control field 660 and the EOH field 663 in the fifth or last HE control field 660 may be set to 1 to indicate that the fifth HE control field 660 is the end or last HE control field 660 in the MAC frame.

Figure 7B:
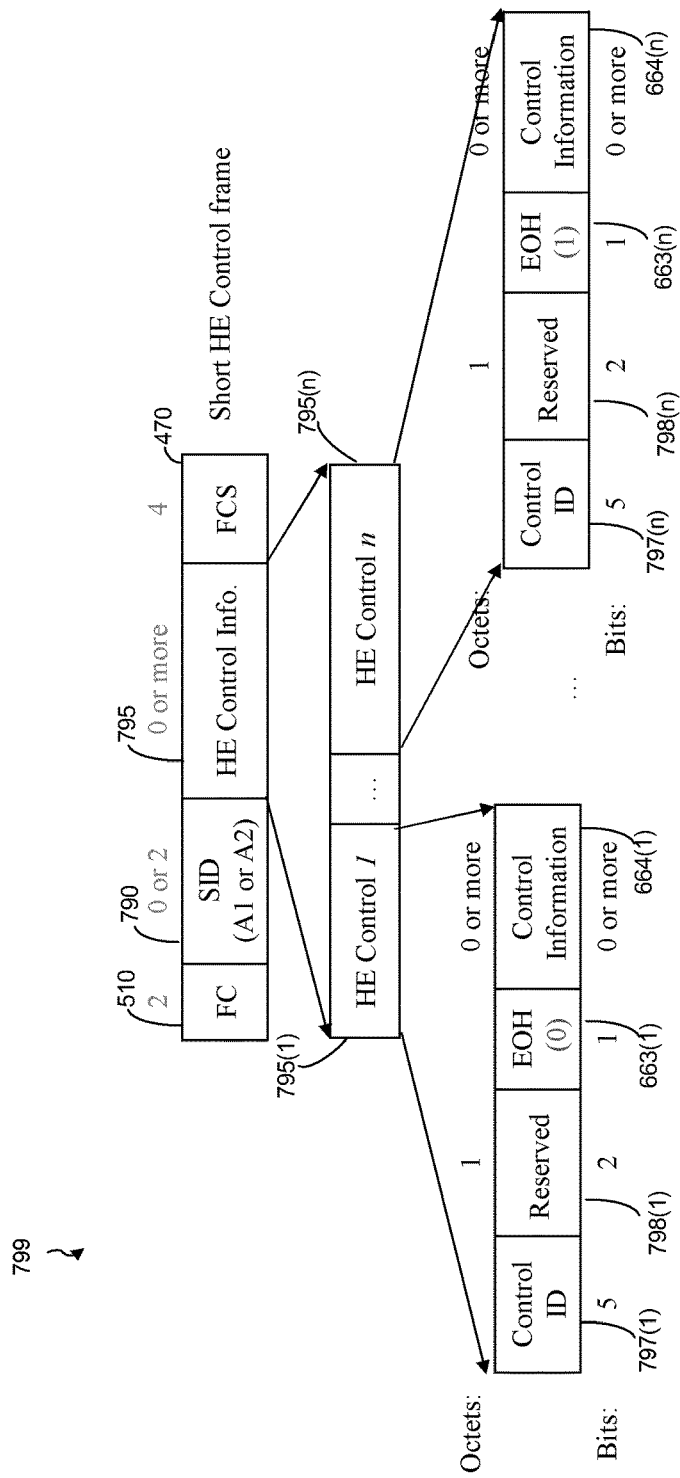
FIG. 7B is a diagram of another exemplary MAC frame comprising a HE control field which comprises multiple HE control fields.

FIG. 7B is a diagram of an exemplary short form MAC frame 799 comprising a HE aggregated control (HE A-control) field 795 which comprises multiple HE control fields 795. FIG. 7B is similar to and adapted from MAC frame 700 of FIG. 7. Only differences between the MAC frames 700 and 799 are described herein for the sake of brevity. As shown in FIG. 7B, HE control field 795 is located after a service identifier (SID) field 790. The SID field 790 may comprise the A1 530 or A2 535 fields of FIG. 7A. As shown in FIG. 7B, the HE control field 795 comprises a control ID field 797, a reserve field 798 and omits the VHT field 601 and HE field 661 of the HE control field 660 of FIG. 7A. In some aspects, the short form MAC frame 799 may have a smaller MAC overhead (e.g., 6-8 Bytes) than other MAC frames, which, in addition to aggregating HE Control fields (rather than aggregating MPDUs in A-MPDUs), reduces the MAC overhead. In some aspects, the first HE control field 795 of the multiple HE control fields 795 (e.g., 795(1) shown in FIG. 7B) may correspond to the HE control field 795 having the lowest control ID value in the control ID field 797. In some embodiments, subsequent HE control fields 795 may be ordered by non-decreasing values of the control ID field 797. In some aspects, the first HE control field 795 of the multiple HE control fields 795 (e.g., 795(1) shown in FIG. 7B) may correspond to the HE control field 795 with a control ID value in the control ID field 797 equal to 0. In this embodiment, the subsequent HE control fields 795 may not be ordered based on the value of the control ID field 797.

In some aspects, a padding field (not shown) may follow the last HE control field 795 (e.g., 795(n)) of the aggregated HE control field 795. The padding field may be included such that the value of the aggregated HE control field 795 satisfies a certain length requirement (e.g., 30 bits) when carried in a HT control field (e.g., HT control field 600). In some aspects, an indication of the when the padding starts (e.g., location of the padding field) may be included in a field of the aggregated HE control field 795 (e.g., the reserved field 798 or EOH field 663 of one or more of the HE control fields 795). In some aspects, the indication may also include the padding contents (e.g., sequence of zeros, ones, or other value). In other aspects, there may be no indication and the padding may comprise a sequence of zeros. In some aspects, the padding may comprise a sequence of zeros and the start of padding may be determined by a device receiving the HE control field 795 by the occurrence of a sequence of zeros (with a maximum length corresponding to the size of the control ID value) following the end of an HE control field 795. In some aspects, the HE control field 795 is either the first and only HE control field 795 (and has a zero value in the control ID field 797), or is the last HE Control field 795 that has a non-zero value of the control ID field 797.

In some aspects, a bit in the Frame Control field 510 may indicate that the control wrapper format is redefined. For example, any reserved field can be used for indicating the control wrapper format is redefined. In other aspects, the use of an order bit of the FC field 510 of any control frame may indicate the presence of the HE A-Control field 795 in the respective control frame.

In some aspects, the short form MAC frame 799 may comprise a MAC header portion (not shown), the aggregated HE control field 795 and the FCS field 470. In some embodiments, the MAC header portion comprises the FC field 510 and the SID field 790 shown in FIG. 7B. In some aspects, the short form MAC frame 799 may be referred to as an HE A-Control frame 799. In some embodiments, the HE A-Control frame 799 may be defined as a new subtype of a control frame. In other aspects, the HE A-Control frame 799 may be carried in a multi-STA block acknowledgement (BA) frame. The use of the multi-STA BA frame to carry the HE A-Control frame 799 may be beneficial because it can be generated by both an AP and a non-AP STA. Additionally, the multi-STA BA frame may provide a unified way of signaling HE control information and can enable a STA to send the necessary HE control information whenever needed/requested and with no restrictions. The HE A-Control frame 799 may be carried in a trigger frame used to trigger MU-UL or MU-DL transmissions.

As discussed above, the content, type, and/or length of the information in the control information field 664 may depend on the value of the control ID field 662 itself or of a length field that may be added to the HE control field 660 itself. FIG. 8A is a chart of exemplary values of the control ID field 662 and what those values indicate about the information in the control information field 664. As shown in FIG. 8A, column 801 illustrates various values for the control ID field 662, column 802 illustrates various control information that will be included in the control information field 664 and an exemplary size of the control information field 664 in parenthesis, and column 803 illustrates various descriptions for the control information included in the control information field 664. For example, as illustrated in row 810 of FIG.

8A, a value of 0 in the control ID field 662 indicates a successful reception (RX) of a preceding MPDU frame and the control information field 664 may comprise acknowledgement (ACK) information and a value of 1 in the control ID field 662 indicates a failed reception of the preceding MPDU frame and the control information field 664 may comprise not acknowledgement (NACK) information. Some non-limiting benefits of including ACK/NACK in the HE control field 660 are that there may not be a need to aggregate ACK messages, which may reduce MAC overhead, and that the HE control field 660 may provide effective signaling for NACK messages. The values and descriptions provided in FIG. 8A are exemplary and other content and descriptions for different control ID field 662 values are possible. For example, the control ID field 662 may also indicate target wait time (TWT) related information, power control signaling, link adaptation information, operation mode changes (e.g., enabling RTS/CTS instruction, reducing or increasing BSS operation functionalities (baseline MCS/SS/BW, etc.)), energy detection information, performance metrics, coordination/scheduling information, basic service set (BSS) related signaling, etc.

FIG. 8B is a chart of other exemplary values of the control ID field 797 of FIG. 7B and what those values indicate about the information in the control information field 664.

Figures 9, 10:
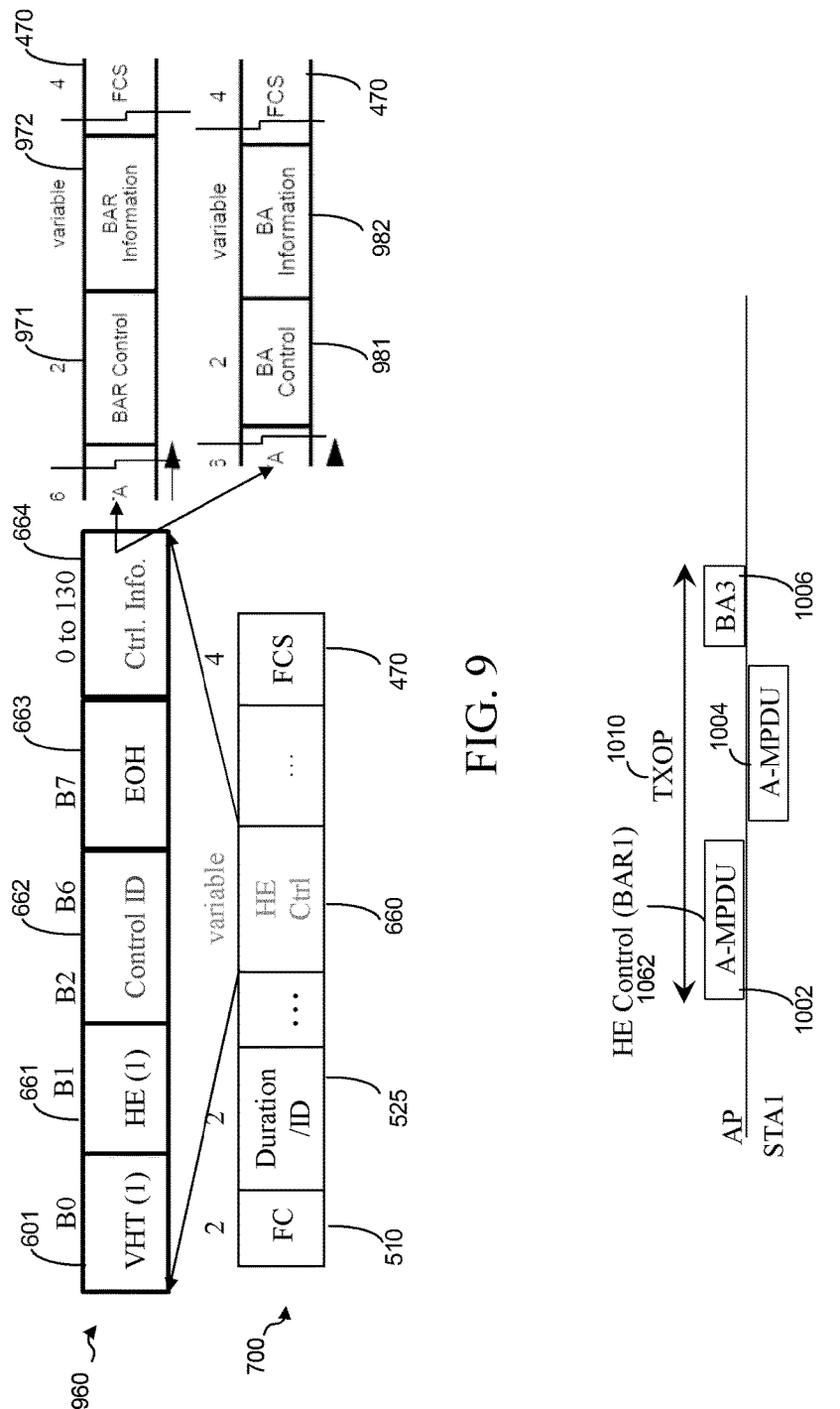
FIG. 9 is a diagram of a control information field format of the HE control field when the control ID field indicates block acknowledgement request (BAR) or block acknowledgement (BA) information.
FIG. 10 is a time sequence diagram showing an exemplary frame exchange in the wireless communication system 100.

Another example of types of information indicated in the control ID field 662 or 797, as shown in rows 811 and 812 of FIG. 8A, include BAR information that may comprise 4 bytes and BA information that may comprise anywhere from 4 to 130 or more bytes. FIG. 9 is a diagram of the control information field 664 format when the control ID field 662 indicates BAR or BA information. For example, in conjunction with FIG. 8A, when the control ID field 662 value is 2, it indicates a BAR and the control information field 664 of HE control field 960 comprises a BAR control field 971 and a BAR information field 972. Similarly, in conjunction with FIGS. 7B and 8B, when the control ID field 797 is 2, it indicates a BAR and the control information field 664 of HE control field 960 comprises a BAR control field 971 and a BAR information field 972. While as shown in FIGS. 8A and 8B a value of 2 in the control ID fields 662 and 797 to indicate that the control ID fields 662 and 797 and the control information fields 664 includes information related BAR, other values in the control ID fields 662 and 797 are also possible to indicate BAR information. In some aspects, the BAR control field 971 comprises 2 bytes and the BAR information field 972 comprises a variable number of bytes. In another example, when the control ID field 662 value is 3, it indicates a BA which indicates a receive status of previously received MPDUs and the control information field 664 comprises a BA control field 981 and a BA information field 982. In some aspects, the BAR control field 981 comprises 2 bytes and the BAR information field 982 comprises a variable number of bytes. Some non-limiting benefits of including BAR/BA in the HE control field 660 are that there may not be a need to aggregate BAR/BA messages, which may reduce MAC overhead.

FIG. 10 is a time sequence diagram showing an exemplary frame exchange 1000 in the wireless communication system 100. In the embodiment of FIG. 10, an AP and a STA1 may negotiate 2 downlink (DL) BA (with traffic identifiers TID 1, TID 2) and 1 uplink (UL) BA (with TID 3) sessions to occur within a transmission opportunity (TXOP) 1010. The AP requests a BA for TID 1 (e.g., a BAR1 included in a HE control field 1062) in an aggregated MPDU (A-MPDU) 1002 with TID 2. As shown, the STA1 responds with 2 BAs, BA1 for TID 1 (BAR1), and BA2 for TID2 (A-MPDU 1002) in an A-MPDU 1004 with TID 3. The A-MPDU 1004 comprises HE control field 1064 which includes BA1, BA2, and a cyclic redundancy check (CRC) for increasing protection. In response to the A-MPDU 1004 with TID3, the AP transmits a BA3 1006. While as shown only HE control field 1064 includes a CRC, in some embodiments, the AP and/or the STA1 can add a CRC to the HE Control field for increasing protection. The use of HE control fields shown in the exemplary frame exchange 1000 may reduce the MAC overhead within the TXOP 1010 by approximately 60 bytes. These bytes could be used to eliminate single point of failures induced by aggregating control frames. For example, HE control fields can be added to each MPDU and can be protected by an 8 bit CRC.

Figure 11:
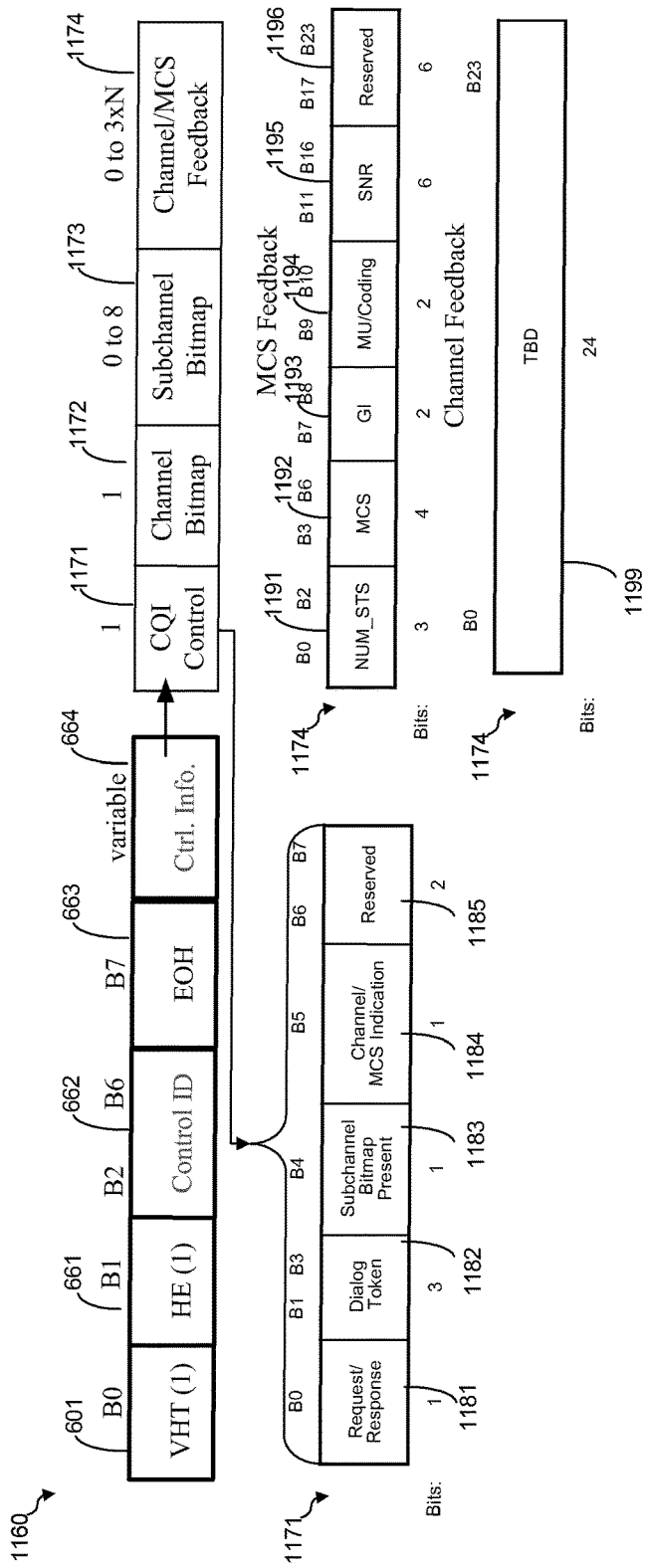
FIG. 11 is a diagram of the control information field format of the HE control field when the control ID field indicates channel quality information (CQI) or modulation and coding scheme (MCS) feedback information.

Another example of types of information indicated in the control ID field 662 or 797, as shown in row 813 of FIG. 8A, include channel quality information (CQI) and MCS feedback information that may comprise a variable number of bytes. The CQI and MCS feedback information may provide STAs communicating with each other information regarding the channel quality and/or MCS. For example, a STA that is the intended receiver of a communication may want to signal to the transmitting STA/AP a preferred MCS rate or an update on a channel quality status so that the transmitting STA may make an appropriate selection of the MCS, channel, spatial streams, or other transmission parameters for transmission. FIG. 11 is a diagram of the control information field 664 format of HE control field 1160 when the control ID field 662 indicates CQI or MCS feedback information. For example, in conjunction with FIG. 8A, when the control ID field 662 value is 4, it indicates CQI or MCS feedback information and the control information field 664 comprises CQI control field 1171, a channel bitmap field 1172, a subchannel bitmap field 1173, and a channel/MCS feedback field 1174. In some embodiments, the CQI control field 1171 may comprise 1 byte, the channel bitmap field 1172 may comprise 1 byte, the subchannel bitmap field 1173 may comprise 0 to 8 bytes, and the channel/MCS feedback field 1174 may comprise 0 to 3 times the number of spatial streams (N). As shown in FIG. 11, the CQI control field 1171 may comprise a request/response field 1181, a dialog token field 1182, a subchannel bitmap present field 1183, channel/MCS indication field 1184, and a reserved field 1185. The channel/MCS feedback field 1174 may comprise two different formats depending on whether the control information field 664 is carrying CQI or MCS feedback information. As shown in FIG. 11, when the control information field 664 includes MCS feedback information, the channel/MCS feedback field 1174 may comprise a number of spatial streams (NUM_STS) field 1191, a MCS field 1192, a guard interval (GI) field 1193, a multi-user (MU)/coding field 1194, a signal-to-noise ratio (SNR) field 1195, and a reserved field 1196. When the control information field 664 includes channel feedback information, the channel/MCS feedback field 1174 may comprise a different set of fields which may include a SNR or receive signal strength indicator (RSSI) information.

In some embodiments, the CQI/MCS feedback can be requested/provided by a STA for each channel and/or OFDMA subchannel as specified by the bitmaps (e.g., channel bitmap field 1172 and/or subchannel bitmap field 1173). The subchannel bitmap present field 1183 may indicate whether feedback should be provided/requested on a subchannel and the channel/MCS indication field 1184 may indicate whether the channel/MCS feedback field 1174 should contain MCS feedback or channel feedback as described above. A STA can provide to the requesting STA two types of feedback (parametrical or statistical). Parametrical feedback can indicate a recommended set of transmission parameters to be used by the requesting STA for transmissions to the STA. Statistical feedback may indicate a set of channel estimation metrics (e.g., SNR, RSSI, etc.) that allow the requesting STA to estimate the quality of the channels/subchannels at the STA.

Figure 12:
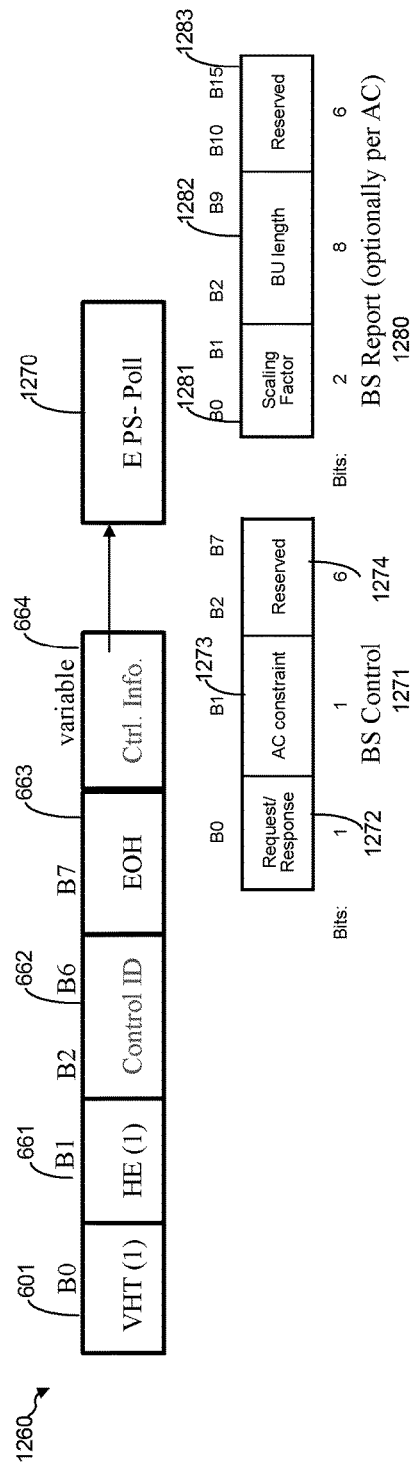
FIG. 12 is a diagram of the control information field format when the control ID field indicates an enhanced PS-poll (ePS-Poll) information.

Another type of information indicated in the control ID field 662 or 797, as shown in row 814 of FIG. 8A, includes power-save poll (PS-poll) information. The PS-poll information may provide STAs communicating with each other information a power-save that includes UL buffer status report. FIG. 12 is a diagram of the control information field 664 format when the control ID field 662 indicates an enhanced PS-poll (ePS-Poll) information. For example, in conjunction with FIG. 8A, when the control ID field 662 value is 5, it indicates an ePS-Poll which includes a UL buffer status report and the control information field 664 of HE control field 1260 comprises ePS-Poll field 1270. The ePS-Poll field 1270 comprises buffer status (BS) control field 1271 and a BS report field 1280. As shown below the ePS-Poll field 1270 in FIG. 12, the BS control field 1271 comprises a request/response field 1272, an access category (AC) constraint field 1273, and a reserved field 1274. The BS report field 1280 comprises a scaling factor field 1281, a bufferable unit (BU) length field 1282 and a reserved field 1283. The scaling factor field 1281 may allow a STA to cover a wider range of BU length. In certain embodiments, the bufferable unit (BU) length indicates the size of BUs in octets while in certain other embodiments, this indicates the duration of time (e.g., in μs or scaled appropriately with the scaling factor) required to transmit the BUs.

In some embodiments, an AP may ask a STA to provide an UL BS report so that the AP knows and can allocate resources for an UL communication. The AC constraint field 1273 may indicate that BS request or response will be for each AC (AC constraint field 1273 is 1) or common for all ACs (AC constraint field 1273 is 0). In some aspects, of power-save signaling may be provided in the ePS-poll 1270.

Figure 13:
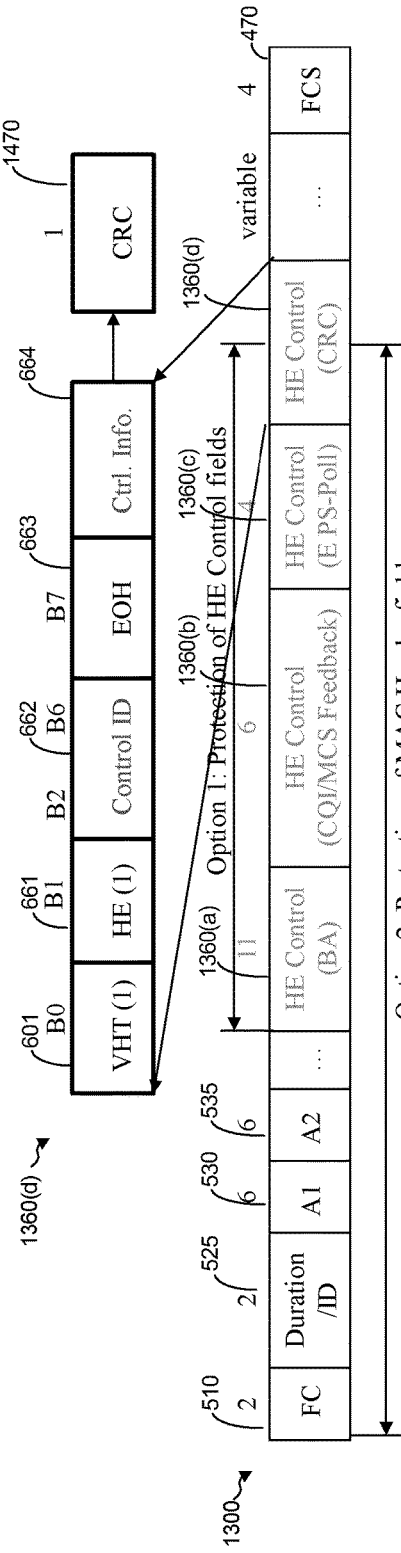
FIG. 13 is a diagram of the control information field format when the control ID field indicates CRC information.

Another type of information indicated in the control ID field 662 or 797, as shown in row 815 of FIG. 8A, includes CRC-based protection information that may comprise 1 byte. The CRC information may provide CRC-based protection for the preceding fields of the MAC header for a MAC frame (e.g., MAC frame 700 of FIG. 7A). FIG. 13 is a diagram of the control information field 664 format when the control ID field 662 indicates CRC information. For example, in conjunction with FIG. 8A, when the control ID field 662 value is 31, it indicates the presence of CRC protection and the control information field 664 of HE control field 1360(d) comprises CRC field 1370. The CRC field 1370 may provide protection for all the preceding HE control fields of a MAC frame (e.g., MAC frame 1300 described below) or for all preceding fields contained in the MAC header of the MAC frame. In certain embodiments, the CRC field 1370 may always be present at the end of the HE control field 1360, hence, there may be no need for a control ID field to indicate the end of the HE control field.

As shown in FIG. 13, HE control field 1360(d) comprises a field of a MAC frame 1300. MAC frame 1300 is similar to and adapted from MAC frame 700 of FIG. 7A. Only differences between the MAC frames 700 and 1300 are described herein for the sake of brevity. MAC frame 1300 comprises multiple HE control fields 1360. As shown, MAC frame 1300 comprises HE control field 1360(a) which in some aspects corresponds to HE control field 960 of FIG. 9, HE control field 1360(b) which in some aspects corresponds to HE control field 1160 of FIG. 11, HE control field 1360(c) which in some aspects corresponds to HE control field 1260 of FIG. 12, the HE control field 1360(d), and may include other HE control fields (not shown). In some aspects, one or more of the multiple HE control fields 1360 may be addressed to one or more STAs. For example, in a DL MU PPDU, the HE control field 1360(a) may be addressed to a first STA and the HE control field 1360(b) may be addressed to a second STA. In some aspects, the number of HE control fields 1360 may be based on the number of STAs the DL MU PPDU is intended for. For example, if the DL MU PPDU is intended for four STAs, the PPDU may comprise four HE control fields 1360, one for each STA, although more or less HE control fields 1360 for each STA are also possible.

In some embodiments, a STA may add HE Control field 1360(d) containing a CRC field 1370 for protecting all preceding HE Control fields (e.g., Option 1 shown in FIG. 13 protecting HE Control fields 1360(a)-(d) of the MAC frame 1300). A non-limiting benefit for this embodiment is that it may allow separate error detection for control information signaling from the rest of the MAC frame 1300. A CRC pass indicates that control information has been received correctly independently of an FCS state. In other embodiments, the CRC field 1370 protects all preceding fields contained in the MAC header of the MAC frame 1300 (e.g., Option 2 shown in FIG. 13 protecting HE Control fields 1360(a)-(d) and all preceding fields up to FC field 510 of the MAC frame 1300). A non-limiting benefit for this embodiment is that it may allow for early detection of essential information. The CRC protection in this embodiment may also whether the MAC frame 1300 is generated by a member STA or a non-member STA (e.g., for spatial reuse) or whether the MAC frame 1300 is intended for a particular STA, and if not, then correctly set a network allocation vector (NAV) (e.g., for TXOP protection and power save).

Figure 14:
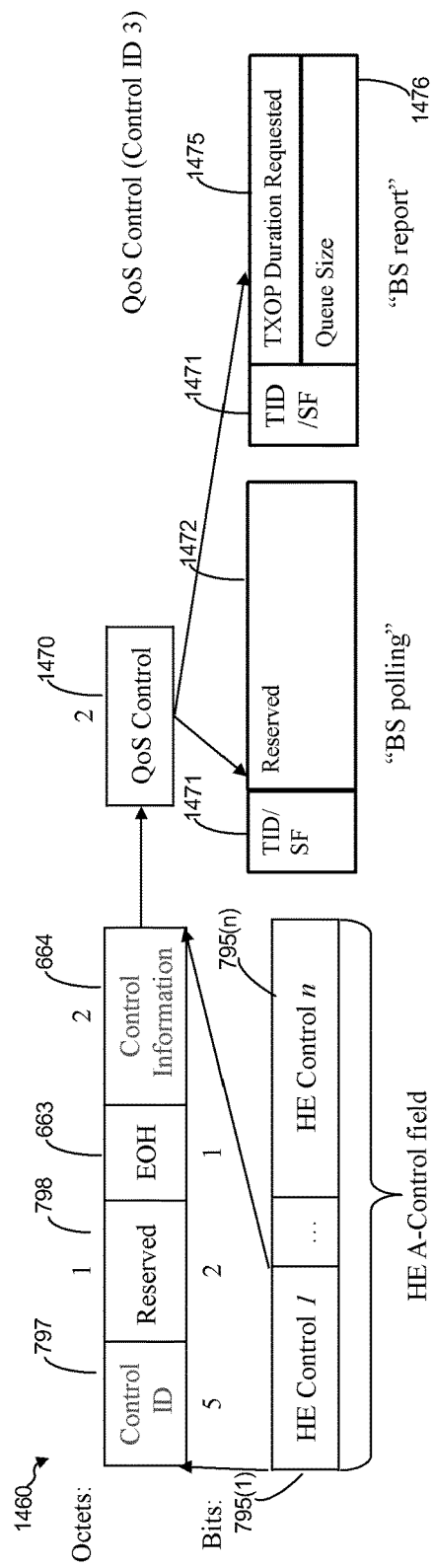
FIG. 14 is a diagram of the control information field format when the control ID field indicates quality of service (QoS) information.

Another type of information indicated in the control ID field 662 or 797, as shown in row 863 of FIG. 8B, includes quality of service (QoS) information. The QoS information may provide STAs communicating with each other an indication of a buffer status request/report (i.e., an enhanced version of QoS Control). FIG. 14 is a diagram of the HE control information field 795 format when the control ID field 797 indicates a QoS information. For example, in conjunction with FIG. 8B, when the control ID field 662 value is 3, it indicates a buffer status request/report (i.e., an enhanced version of QoS Control) and the control information field 664 of HE control field 1460 comprises a QoS Control field 1470. In some aspects, the QoS Control field 1470 may comprise 2 bytes. The QoS Control field 1470 comprises a TID/SF field 1471 and a reserved field 1472 when conducting BS polling and comprises the TID/SF field 1471, a TXOP duration field 1475, and a queue size field 1476 when conducting a BS report. In some aspects, the AP may poll the STAs for their buffer status by sending BS polling frames that contain the QoS Control field 1470. The QoS Control field 1470 may specify whether polling is "per-TID", "all-TID", and other related BS polling parameters. In response, non-AP STAs may deliver BS reports in the QoS Control field 1470. In some aspects, per-TID BS information is carried in QoS Data and QoS Null frames. In other aspects, all-TID, per-TID BS information is carried in the QoS Control field 1470. In some aspects, the QoS Control field 1470 may be aggregated with other information in the HE control field 660. A non-limiting benefit of the QoS Control field 1470 is that it may reduce the MAC overhead incurred.

Figure 15:
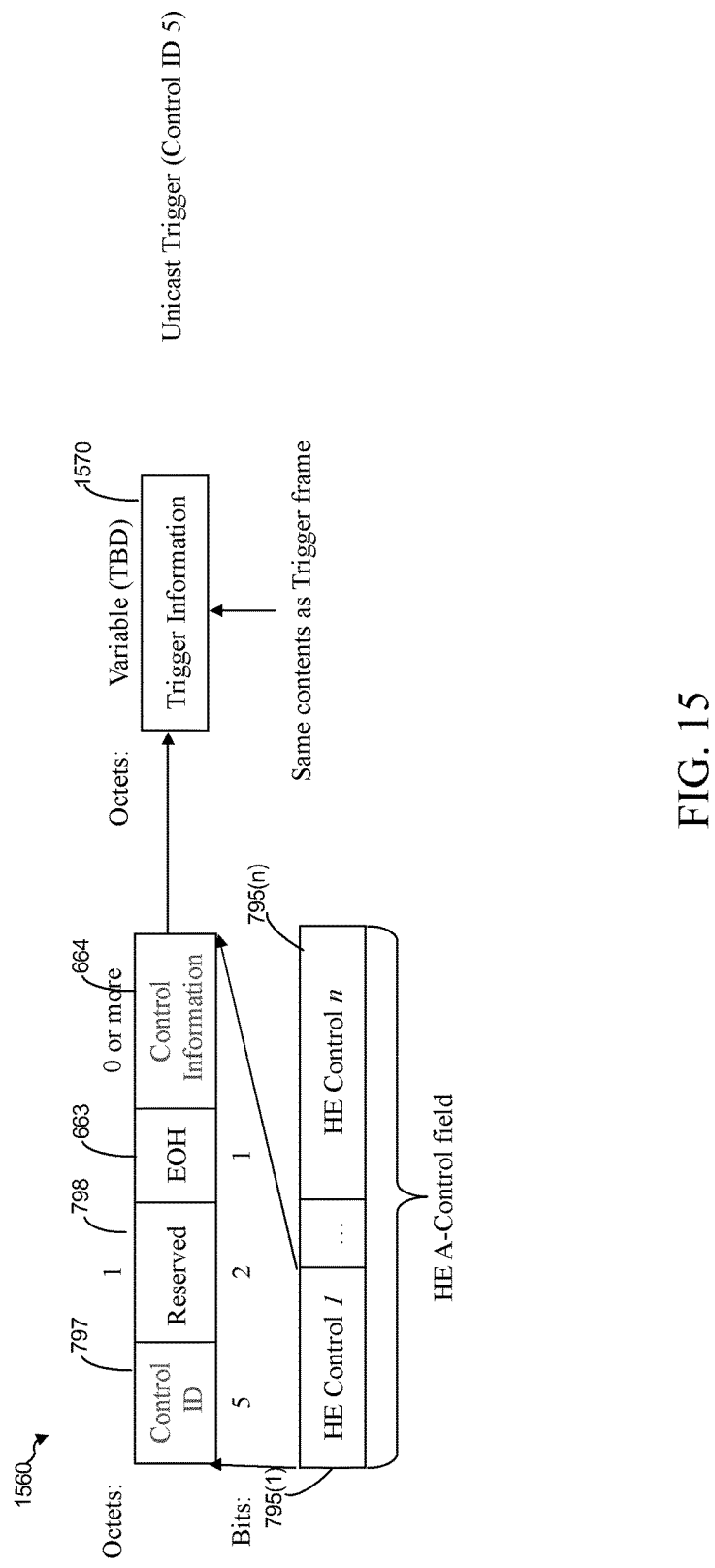
FIG. 15 is a diagram of the control information field format when the control ID field indicates trigger information.

Another type of information indicated in the control ID field 662 or 797, as shown in row 865 of FIG. 8B, includes unicast trigger information. The unicast trigger information may provide STAs communicating with each other an indication of a trigger frame (resource allocation and other parameters for uplink). FIG. 15 is a diagram of the HE control information field 795 format when the control ID field 797 indicates unicast trigger information. For example, in conjunction with FIG. 8B, when the control ID field 662 value is 5, it indicates a trigger frame (i.e., an enhanced version of QoS Control) and the control information field 664 of HE control field 1560 comprises a trigger information field 1570. In some aspects, the trigger information field 1570 may comprise a variable number of bytes. The trigger information field 1570 may comprise information regarding the trigger frame, subchannel allocation for a STA, a compressed/uncompressed UL MAC format, etc. In some aspects, the trigger information field 1570 may be aggregated with other information in the HE control field 660 and may be carried in a DL MU PPDU. A non-limiting benefit of the trigger information field 1570 is that it may reduce the MAC overhead incurred. For example, by being a part of a HE control field 660 in a DL MU PPDU, the additional control information regarding the trigger frame can be carried in a DL MU PPDU with minimal overhead.

In some aspects, the HE control field 660 may be carried in a UL MU PPDU. In an UL MU PPDU, the AP 110 may receive two or more PPDUs from two or more STAs. The UL MU PPDU may comprise one or more of the HE control fields 660 located in different parts of the UL MU PPDU as described herein (e.g., in the PHY header as part of a signal field (SIG-A, SIG-B or SIG-C). For example, threes STAs may transmit information in a UL MU PPDU by transmitting three independent SIG-B fields 1700 (discussed below), one for each STA, each comprising one or more of the HE control fields 660. In some embodiments, the SIG-B fields 1700 may be multiplexed in code, frequency or time by some other means (e.g., using CDMA, OFDMA, TDMA, SDMA, etc.). Additionally, for both DL and UL MU PPDUs, the PPDUs may be multiplexed in code, frequency or time by some other means to generate the MU PPDUs from and/or to multiple STAs.

Figure 16:
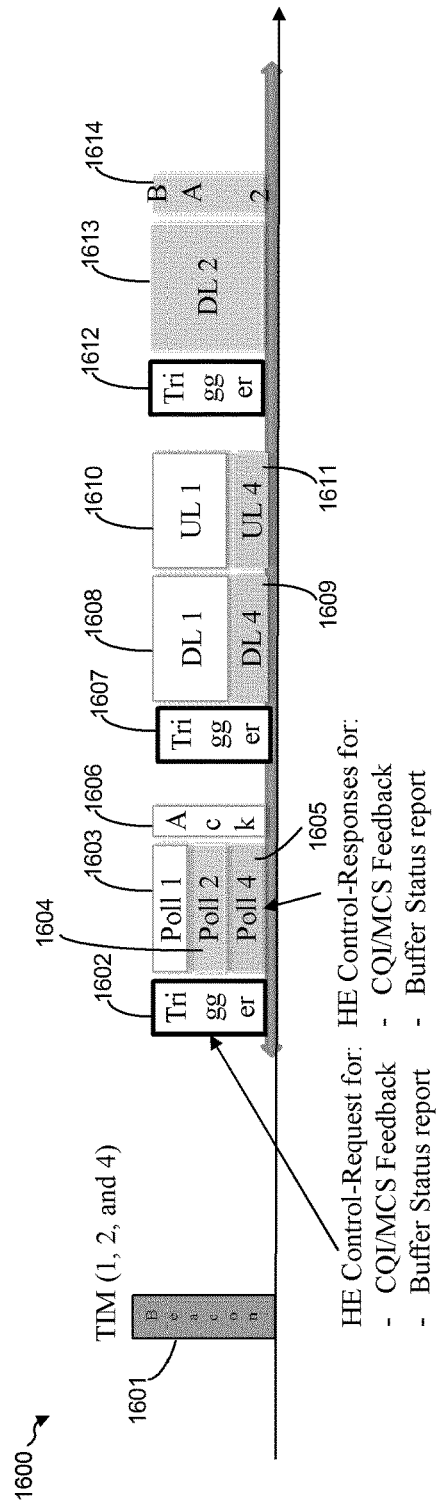
FIG. 16 is a time sequence diagram showing another exemplary frame exchange in the wireless communication system 100.

FIG. 16 is a time sequence diagram showing an exemplary frame exchange 1600 in the wireless communication system 100. In the embodiment of FIG. 16, an AP may transmit a beacon message 1601 with traffic indication maps TIM 1, TIM 2, and TIM 4. The AP may then send a trigger message 1602 to request control information from the STAs for which it has DL BUs feedback. For example, the AP may request QCI/MCS feedback and/or a BS report to adjust DL BU transmission parameters for each of the STAs. STAs (e.g., STA1, STA2, STA4) may report back by sending an enhanced PS-Poll frames 1603, 1604, and 1605, respectively. The ePS-Poll frames 1603, 1604, and 1605 may correspond to the ePS-Poll field 1270 of FIG. 12 and may include HE control responses for the requests in the trigger message 1602. The ePS-Poll frames 1603, 1604, and 1605 may include recommended DL resources (e.g., best M number of resources (in terms of channels, MCS, signal strength etc.)) and a BS report including the amount of data each STA has for UL to the AP. Upon receiving this information the AP acknowledges receipt by sending ACK 1606 and schedules DL/UL transmissions for these STAs (e.g., using trigger message 1607 for scheduling DL 1 message 1608, DL 4 message 1609, UL 1 message 1610, and UL 4 message 1611 and using trigger message 1612 for scheduling DL 2 message 1613 and BA 2 message 1614).

The AP may schedule the DL/UL transmissions using one of the recommended TX parameters from each STA and using the buffer status information received in the ePS-Poll frames 1603, 1604, and 1605 for an efficient allocation of network resources.

Figure 17A:
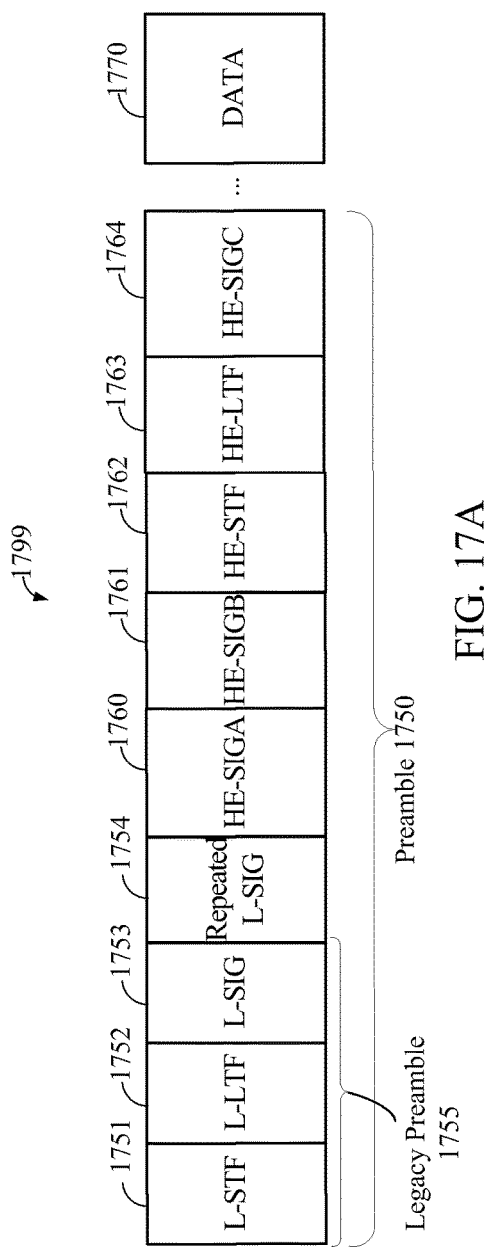
FIG. 17A is a diagram of an exemplary PPDU format.

In some embodiments, a HE control field (e.g., HE control field 660) may be located in other parts of a PPDU frame. In some aspects, the HE control field 660 may be located in any field of a preamble portion of the PPDU. FIG. 17A is a diagram of an exemplary 802.11 PPDU 1799. The PPDU 1799 may comprise a preamble portion 1750 and a data portion 1770. The preamble portion 1750 may comprise a legacy preamble portion 1755. As shown, the legacy preamble portion 1755 comprises contains a legacy short training field (L-STF) 1751, a long training field (L-LTF) 1752, and a signal field (L-SIG) field 1753. The preamble portion 1750 further comprises a repeated L-SIG field 1754, a HE-SIGA field 1760, a HE-SIGB field 1761, a HE-STF field 1762, a HE-LTF field 1763 and a HE-SIGC field 1764. In some aspects, the preamble portion 1750 can include additional fields (not shown), fields can be rearranged, removed, and/or resized, and the contents of the fields varied. For example, in various embodiments, the preamble portion 1750 can further include one or more of: a STF field (e.g., HT-STF, VHT-STF, HE-STF), a LTF field (e.g., HT-LTF, VHT-LTF, HE-LTF), one or more additional signal fields (e.g., additional HE-SIGA, HE-SIGB, HE-SIGC fields, HT-SIGA, VHT-SIGB, VHT-SIGC, one or more repeated fields, etc.). In some aspects, starting from a particular field of the PPDU 1799 (e.g., HE-SIGB 1761 in DL MU PPDU or from HE-STF 1762 in UL MU PPDU), that particular field, and the following fields, may contain information for more than one STA if the PPDU is MU. Additionally, the information for more than one STA multiple users may be multiplexed in frequency, time, or code.

Figure 17B:
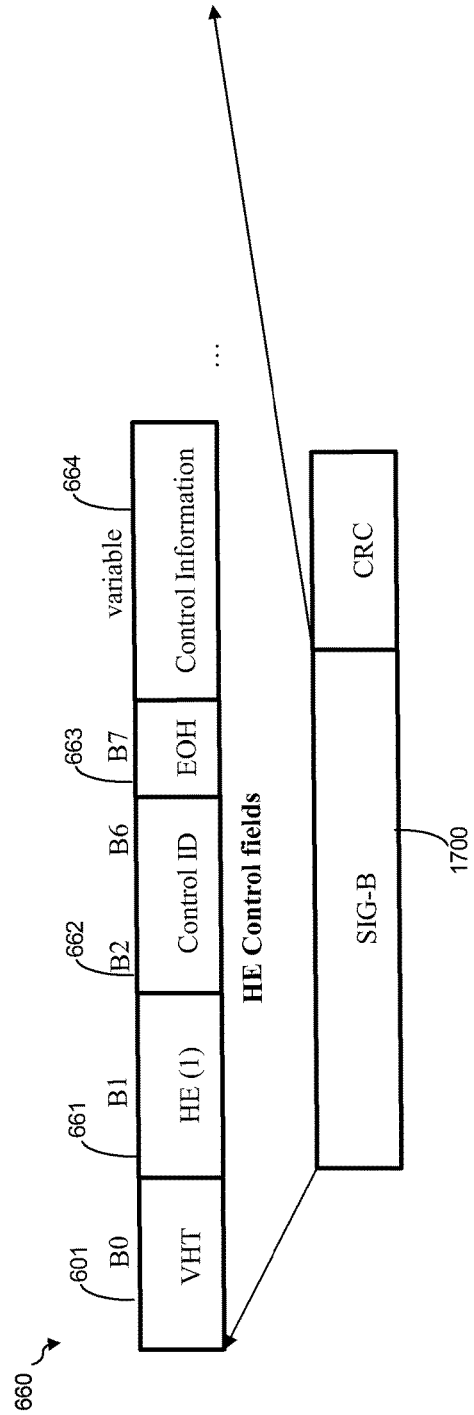
FIG. 17B is a diagram of the HE control field included in a SIG-B field of a physical layer (PHY) header of a PPDU.

FIG. 17B is a diagram of the HE control field 660 included in a SIG-B field 1700 of a physical layer (PHY) header of a PPDU (e.g., PPDU frame 400 or 1799). In some embodiments, the SIG-B field 1700 is an HE SIG-B field of a HE PHY header as defined in an 802.11 standard. In some aspects, when a bit (B1) of the SIG-B field 1700 is set to 0 then the content of the SIG-B field 1700 is whatever the PHY designs. In other aspects, when a bit (B1) of the SIG-B field 1700 is set to 1 then the content of the SIG-B field 1700 is one or more HE control fields 660. In some embodiments, the PPDU frame is a HE NDP carrying MAC information (CMAC) frame if a length of a L-SIG field indicates that it is a CMAC frame. In some aspects, a bit (B0) can be used as NDP indication (if 1 then NDP, otherwise a PLCP Service Data Unit (PSDU) is present). A non-limiting benefit of including the HE control field in the SIG-B field is that it may provide a solution to move forward a trigger frame design because the HE Control field 660 can carry the contents of a trigger frame. Additionally, it may reduce the risk of having a parallel design for a PHY Trigger frame because the content of the HE Control field 660 to the PHY is provided by the MAC.

As described above, the HE control field 660 may be located in any of the fields of the preamble portion 1750 of FIG. 17A (e.g., L-STF 1751, L-LTF 1752, L-SIG 1753, repeated L-SIG field 1754, HE-SIGA field 1760, HE-SIGB field 1761, HE-SIGC field 1764, etc.), including additional fields not shown. Additionally, one or more HE control fields 660 may be included in one or more of the preamble portion 1750 fields for one or more STAs receiving the PPDU 1799. For example, HE-SIGB 1761 may comprise one or more HE control fields 660 intended for one or more STAs and HE-SIGC 1764 may comprise one or more HE control fields 660 intended for one or more different STAs.

Figure 18:
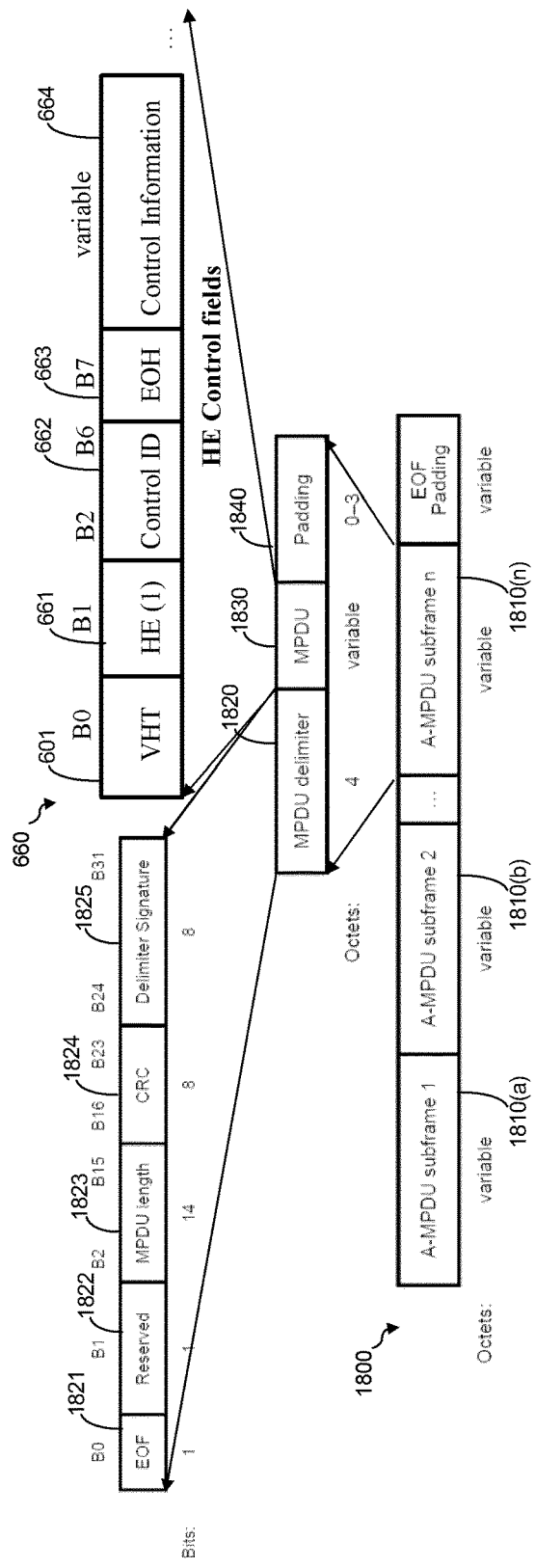
FIG. 18 is a diagram of an A-MPDU which includes multiple A-MPDU subframes.

In some embodiments, the HE control field 660 may be located in an aggregated A-MPDU subframe. For example, FIG. 18 is a diagram of an A-MPDU 1800 which includes multiple A-MPDU subframes 1810. As shown, A-MPDU 1810(n) comprises a MPDU delimiter field 1820, a MPDU field 1830, and a padding field 1840. The MPDU delimiter field 1820 comprises an end of frame (EOF) field 1821, a reserved field 1822, a MPDU length field 1823, a CRC field 1824, and a delimiter signature field 1825. Additionally, the MPDU field 1830 may comprise the HE control field 660. In some embodiments, the contents of the HE control field 660 may be signaled in the A-MPDU subframe (e.g., A-MPDU subframe 1810(n)). For example, when the MPDU length field 1823 indicates a length of the MPDU is less than 14 Bytes then the MPDU 1830 may contain HE control field 660. In some aspects, the fact that a bit (B1) of the HE control field 660 is non-zero would be enough to determine the MPDU 1830 as a new format of the MPDU because the MPDU 1830 may resemble a PV2 frame. A non-limiting benefit of including the HE control field 660 in an A-MPDU subframe is that A-MPDU subframes containing HE control fields 660 can be used for padding the UL/DL MU PPDUs.

In certain embodiments, at least one or more of the HE control fields 660 that are carried in a PPDU (e.g., PPDU 1799) may contain an indication that the transmitter of the HE control fields 660 contained in the PPDU 1799 requests an acknowledgement for this portion of the PPDU 1799 (i.e., of the control information carried in HE control fields 660). Upon reception of the PPDU 1799 that contains a valid portion of the frame that carries the HE control fields 660, the recipient may acknowledge such reception by sending an acknowledgement. The acknowledgement of correct reception of the HE control field 660 portion can be piggybacked in existing frames (e.g., Ack, BlockAck frames (as part of reserved fields or values therein) or can be a PPDU generated by the recipient that carries one or more HE control fields 660, at least one of which contains an indication of a successful (or unsuccessful) reception of a previously received HE control field 660 portion. In certain embodiments, to distinguish delivery/reception of multiple HE control fields 660 (sent over the air) a token field may be added in the HE control field 660 to identify the information/ack sequence.

Figure 19:
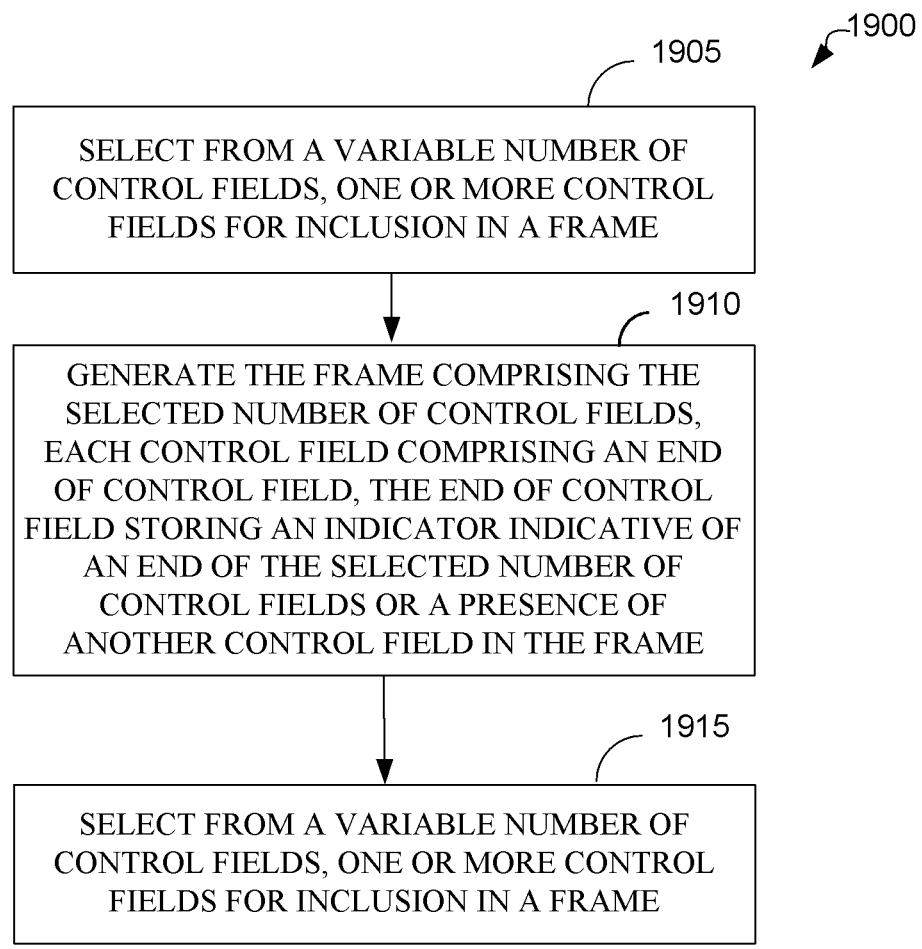
FIG. 19 is a flow diagram of an exemplary method for wireless communication, in accordance with certain aspects of the present disclosure.

FIG. 19 is a flow diagram of an exemplary method 1900 for wireless communication, in accordance with certain aspects of the present disclosure. Method 1900 may be performed by the device 302 in some aspects. The method 1900 may also be performed by one or more of the APs 110 or UTs 120 shown in FIGS. 1 and 2, a person having ordinary skill in the art will appreciate that the method 1900 may be implemented by other suitable devices and systems. Although the method 1900 is described herein with reference to a particular order, in various embodiments, blocks herein may be performed in a different order, or omitted, and additional blocks may be added.

Operation block 1905 includes selecting, from a variable number of control fields, one or more control fields for inclusion in a frame. Operation block 1910 includes generating the frame comprising the selected number of control fields, each control field comprising an end of control field, the end of control field storing an indicator indicative of an end of the selected number of control fields or a presence of another control field in the frame. Operation block 1915 includes transmitting the frame.

In some embodiments, an apparatus for wireless communication may perform one or more of the functions of method 1900, in accordance with certain embodiments described herein. The apparatus may comprise means for selecting, from a variable number of control fields, one or more control fields for inclusion in a frame. In certain embodiments, the means for selecting can be implemented by the processor 304 or DSP 320 (FIG. 3). In certain selecting, the means for generating can be configured to perform the functions of block 1905 (FIG. 19). The apparatus may further comprise means for generating the frame comprising the selected number of control fields, each control field comprising an end of control field, the end of control field storing an indicator indicative of an end of the selected number of control fields or a presence of another control field in the frame. In certain embodiments, the means for generating can be implemented by the processor 304 or DSP 320 (FIG. 3). In certain embodiments, the means for generating can be configured to perform the functions of block 1910 (FIG. 19). The apparatus may further comprise means for transmitting the frame. In certain embodiments, the means for transmitting can be implemented by the transmitter 310 (FIG. 3). In certain embodiments, the means for transmitting can be configured to perform the functions of block 1915 (FIG. 19).

FIG. 20 is a chart of other exemplary values of the control ID field 797 of FIG. 7B and what those values indicate about the information in the control information field 664. As shown in FIG. 20, column 2001 illustrates various values for the control ID field 662, column 2002 illustrates the meaning of the various control information that will be included in the control information field 664, and column 2003 illustrates various descriptions for the control information included in the control information field 664. For example, as illustrated in row 2005 of FIG. 20, a value of 0 in the control ID field 662 means an UL MU response scheduling and indicates the control information field 664 may contain scheduling information for an UL MU PPDU carrying immediate acknowledgement that is expected as a response to the soliciting A-MPDU. An example format of the control information field 664 when the control ID 662 is 0 is shown in FIG. 21A.

FIG. 21A shows a diagram of an exemplary format of the control information field 664 when the control ID field 662 is 0. As shown, the control information field 664 comprises a UL PPDU length field 2102, a resource unit (RU) allocation field 2104, and a third field 2106. The UL PPDU length field 2102 may indicate the length of the UL MU response. In some aspects, the UL PPDU length field 2102 comprises between 9-12 bits. In some aspects, the UL PPDU length field 2102 may contain the 9-12 (the actual value depends on the size of the UL PPDU length field) least significant bits (LSBs) of a length field in the L-SIG field of the PHY header of the frame that is to be sent as a response to the frame containing this control information. The receiving STA populates the 9-12 LSBs in the L-SIG field of the PHY header of the frame it transmits as a response using the contents of the UL PPDU length field 2102 of the soliciting frame and sets the remaining 3-0 MSBs to 0. Alternatively the UL PPDU length field 2102 contains the value in bytes, or in microseconds of the UL PPDU to be sent as a response. In some embodiments, the UL PPDU length field 2102 may not be set to a zero value. The RU allocation field 2104 may indicate the resource unit (RU) assigned for transmitting the UL MU response. In some aspects, the RU allocation field 2104 may comprise between 1-15 bits. The third field may comprise between 1-15 bits and may be reserved for future use.

Referring back to FIG. 20, in row 2006, a value of 1 in the control ID field 662 means a receive operation mode indication and the control information field 664 may contain information related to the receive operation mode of the STA transmitting the MPDU containing the HE control field. An example format of the control information field 664 when the control ID 662 is 1 is shown in FIG. 21B.

FIG. 21B shows a diagram of an exemplary format of the control information field 664 when the control ID field 662 is 1. As shown, the control information field 664 comprises a receiver (RX) number of spatial streams (NSS) field 2152, a RX channel width field 2154, and a third field 2156. The RX NSS field 2152 may indicate the maximum number of spatial streams, $N_{SS}$, supported by the STA in reception, and may be set to $N_{SS}$−1. In some aspects, the RX NSS field 2152 comprises 3 bits. The RX channel width field 2154 may indicate the operating channel width supported by the STA in reception. In some aspects, the RX channel width field 2154 is set to 0 for 20 MHz, 1 for 40 MHz, 2 for 80 MHz, and 3 for 160 MHz. In some aspects, the RX channel width field 2154 may comprise 2 bits. The third field 2156 may comprise between 0-X bits, where X is an integer greater than 1, and may be reserved for future use.

Figure 22:
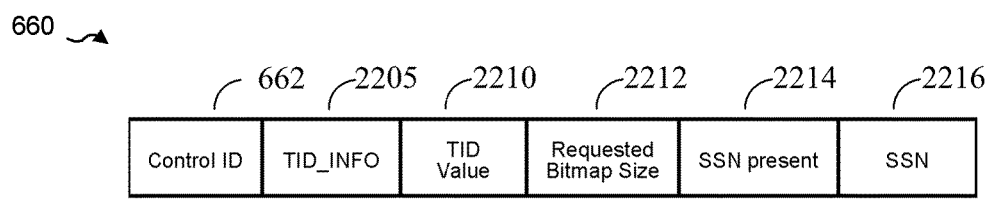
FIG. 22 is a diagram of an exemplary format of the control ID field and the control information field, in accordance with an embodiment.

With reference to FIGS. 6 and 9, FIG. 22 is a diagram of an exemplary control information field 664 format when the control ID field 662 indicates explicit ACK/BA request information. For example, in some aspects, when the control ID field 662 value is 3, it indicates explicit that control information field 664 provides information related to immediate ACK/BA request. As shown in FIG. 22, the control information field 664 of HE control field 660 comprises a TID_INFO field 2205, a TID value field 2210, a requested bitmap size field 2212, a starting sequence number (SSN) present field 2214, and a SSN field 2216. In some aspects, the TID_INFO field 2205 indicates the number of TIDs present in the HE control field 660 (e.g., TID_INFO value+1). In some aspects, the TID value field 2210 indicates the TID for which the requested Ack/BA is for. In some aspects, the requested bitmap size field 2212 indicates the requested (Block) Ack bitmap size (e.g., 0 if 1 bit (i.e., Ack/Nack), 1 if 1 Byte, 2 if 4 Bytes, 3 if 8 Bytes, etc.). In some aspects, the SSN present field 2214 indicates the presence of the SSN field 2216. For example the SSN present field 2214 may be set to 1 if the SSN subfield is present, otherwise it is set to 0. In some aspects, the SSN field 2216 contains the starting sequence number for this TID (A BAR). For example, its presence is an explicit indication for shifting the BA score.

In some aspects, the TID_INFO field 2205 comprises 3 bits, the TID value field 2210 comprises 4 bits, the requested bitmap size field 2212 comprises 2 bits, the SSN present field 2214 comprises 1 bit, and the SSN field 2216 comprises either 0 or 12 bits.

Figure 23:
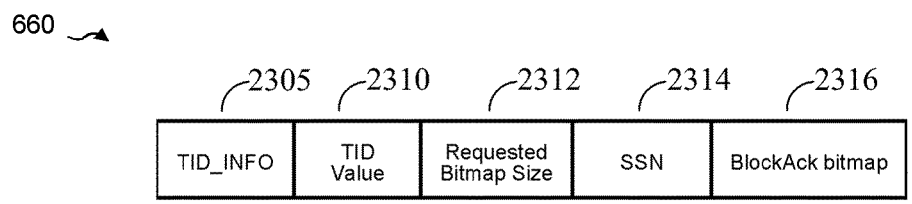
FIG. 23 is a diagram of an exemplary format of the control information field, in accordance with an embodiment.

In another example, the control ID field 662 may indicate explicit ACK/BA response information and the control information field 664 may provide information related to immediate acknowledgement responses. For example, in some aspects, when the control ID field 662 value is 4, it indicates explicit that control information field 664 provides information related to immediate acknowledgement responses. As shown in FIG. 23, the control information field 664 of HE control field 660 comprises a TID_INFO field 2305, a TID value field 2310, a requested bitmap size field 2312, a starting sequence number (SSN) field 2214, and a BA bitmap field 2316. In some aspects, the TID_INFO field 2305 indicates the number of TIDs present in the HE control field (e.g., HE control fields 795 of FIG. 7B). In some aspects, the TID value field 2310 indicates the TID for which the Ack/BA response is for. In some aspects, the requested bitmap size field 2312 indicates the requested (Block) Ack bitmap size (e.g., 0 if 1 bit (i.e., Ack/Nack), 1 if 1 Byte, 2 if 4 Bytes, 3 if 8 Bytes, etc.). In some aspects, the SSN field 2314 contains the starting sequence number for the current TID (BA). In some aspects, the BA bitmap field 2316 includes a bitmap of values for BA. In some aspects, the BA bitmap field 2316 is present if the bitmap size is non-zero.

In some aspects, the TID_INFO field 2305 comprises 3 bits, the TID value field 2310 comprises 4 bits, the requested bitmap size field 2312 comprises 2 bits, the SSN field 2314 comprises either 0 or 12 bits, and the BA bitmap field 2316 comprises either 1, 16, 32, or 64 bits based on the value of the requested bitmap size field 2312.

FIG. 24 is a time sequence diagram 2400 illustrating exemplary frame exchanges comparing a baseline frame exchange (top portion) against a frame exchange utilizing explicit ACK/BA within an HE control field (bottom portion) (e.g., HE control fields 660 and 795). As shown, in FIG. 24, both the baseline and the ACK included in the BA frame show a VHT single MPDU 2401 transmitted from a first device. After a SIFS time period, a second device in the baseline frame exchange transmits an acknowledgement (ACK) message 2402 followed by multiple MPDU messages 2405(a)-2405(n). In the bottom portion, after the SIFS period, the second device may transmit the MPDUs 2410(a)-2410(n) to the first device. The MPDUs 2410(a)-2410(n) including the ACK within the HE control fields 660 and 795.

FIG. 25 is a time sequence diagram 2500 illustrating exemplary frame exchanges comparing a baseline frame exchange (top portion) against a frame exchange utilizing explicit BAR within the HE control fields 660 and 795 (bottom portion). As shown, in FIG. 25, in the baseline top portion frame exchange, a first device transmits MPDUs 2421(a)-2421(n) followed by a BAR 2425. After a SIFS time period, a second device in the baseline frame exchange transmits one or more BAs 2430 followed by one or more MPDUs 2435. In the bottom portion, a first device transmits MPDUs 2440(a)-2440(n) that include the BAR within the HE control fields 660 and 795 of the MPDUs. After a SIFS time period, a second device in the bottom portion frame exchange transmits one or more BAs 2430 followed by one or more MPDUs 2435.

Some non-limiting benefits of including BAR/BA information in one or more of the HE control fields 660 (or HE control fields 795 of FIG. 7B) are that there may not be a need to aggregate BAR/BA messages or multiple control frames, which may reduce MAC overhead. Additionally, the inclusion of the BAR/BA information in the HE control fields is that it may eliminate a single point of failure since each MPDU may carry the BAR/BA information. In some aspects, the use of the HE control fields to carry the BAR/BA information may allow more flexibility as any MPDU can solicit responses for other MPDUs of other TIDs/types. Additionally, the use of multiple HE control fields 660 and 795 enables various combinations of control information that can be added seamlessly (e.g., as shown in FIG. 13). For example, one HE control field 660 may contain information for BAR and another HE control field 660 may contain information for channel quality information.

Figures 26, 27:
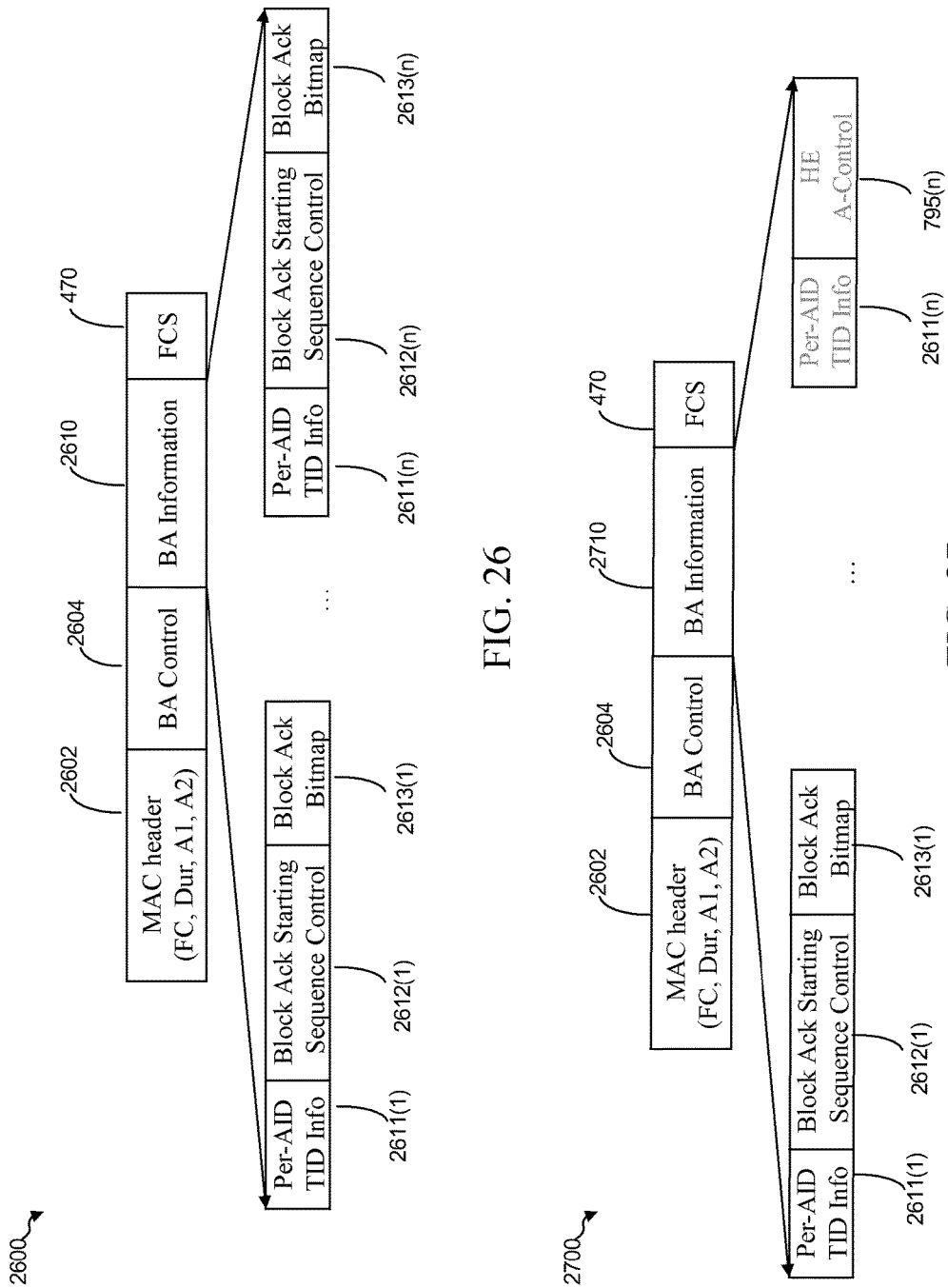
FIG. 26 is a diagram of an exemplary format of a block acknowledgement (BA) frame, in accordance with an embodiment.
FIG. 27 is a diagram of another exemplary format of a BA frame, in accordance with an embodiment.

FIG. 26 is a diagram of an exemplary format of a multi-STA block acknowledgement (BA) frame 2600, in accordance with an embodiment. As shown, the BA frame 2600 comprises a MAC Header portion 2602, a BA control field 2604, a BA information field 2610, and the FCS field 470. In some embodiments, the MAC Header portion 2602 may comprise 2 bytes, the BA control field 2604 may comprise 2 bytes, the BA information field 2610 may comprise a variable number of bytes that contains information for each association identifier (AID) identified in the BA frame 2600.

In some embodiments, the BA information field 2610 may comprise one or more instances of a per-STA information subfield, one for each STA that is being addressed. Each per-STA information subfield includes the traffic identifier (TID) and the AID of the STA receiving the frame 2600. The per-STA information subfield may comprise a per-AID traffic identifier (TID) information field 2611, a block acknowledgement starting sequence control field 2612, and a BA bitmap field 2613. As shown in FIG. 26, the BA frame 2600 contains information for "n" number of STAs and the per-STA information subfields contains per-AID TID information field 2611(1), the block acknowledgement starting sequence control field 2612(1), and the BA bitmap field 2613(1) through the fields 2611(n), 2612(n), and 2613(n) for the STAs 1-n. In some embodiments, the per-AID TID information field 2611 enables ACK/BA for multiple TIDs contained in a multi-TID A-MPDU. The per-AID TID information field 2611 may also comprise an ACK type field (not shown) which may indicate a length of other fields in the BA information field 2610. For example, the per-AID TID information field 2611 may comprise 2 bytes, the block acknowledgement starting sequence control field 2612 may comprise 0 or 2 bytes, and the BA bitmap field 2613 may comprise 0, 4, 8, 32, or a variable number of bytes. The ACK type field may indicate the length for each of those fields. In some aspects, a certain value of the TID (e.g., 15 or another value) may indicate ACK for an action ACK carried in the A-MPDU. The multi-STA BA frame 2600 may be used by an AP as a response to a trigger-enabled PPDU. In some aspects, the BA frame 2600 can be sent in a legacy format, or aggregated in the response A-MPDU. In some embodiments, the BA frame 2600 can be sent by a non-AP STA as a response to DL MU PPDUs and within the response A-MPDU.

FIG. 27 is a diagram of an exemplary format of a multi-STA block acknowledgement (BA) frame 2700 which comprises the HE A-control field 795, in accordance with an embodiment. The BA frame 2700 is similar to and adapted from BA frame 2600 of FIG. 26. Only differences between the BA frames 2600 and 2700 are described herein for the sake of brevity. As shown in FIG. 27, BA frame 2700 comprises BA information field 2710 which includes the HE A-control field 795. While the HE A-control field 795 is shown at the end of the BA information field 2710, it may be located in an portion of the BA information field 2710 or may be associated with any AID or TID value. In some aspects, the HE A-control field 795 may comprises 4, 8 bytes or a variable number of bytes. In some embodiments, a certain TID value may indicate the presence of the HE A-Control field 795. The per STA information subfield associated with this TID value may carry the HE A-Control field 795 rather than the BA starting sequence control field 2612 and/or the BA bitmap field 2613. In some aspects, the ACK type field of the per-AID TID information field 2611 may indicate the length of the HE A-Control field 795. In some aspects, when the ACK type field is a first value, the HE A-Control field 795 is 4 bytes and when the ACK type field is a second value, the HE A-Control field 795 is 8 bytes or a variable number of bytes.

In some aspects, an AP may send, as a response to one or more STAs, the multi-STA BA frame 2700 that contains BA information for one or more of its STAs and a HE A-control field 795 for one or more of its STAs. In some aspects, the BA information and the HE A-control field 795 could be for the same STAs or different STAs. The HE A-Control field 795 can also carry the UL MU resource allocation for the STAs. In other embodiments, a STA may send as a response the multi-STA BA frame 2700 that contains both acknowledgement and feedback information.

Embodiments described herein relating to the HE A-control frame 799 may beneficially help minimize MAC overhead because it may eliminate or reduce the need to aggregate multiple control frames in an A-MPDU. Additionally the HE A-control frame 799 may be legacy compliant (e.g., carried in a legacy PPDU format), all required control information is contained in the same control frame, and may enable combinations of control information to be added seamlessly (e.g., BA/Ack+Trigger, BA/Ack+Buffer Status, BA+CQI+ROMI, enhanced PS-Poll, etc.). Further, the HE A-control frame 799 may provide an efficient and flexible way of delivering HE control information which does not need control wrappers.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

It should be understood that any reference to an element herein using a designation such as "first," "second," and so forth does not generally limit the quantity or order of those elements. Rather, these designations may be used herein as a convenient wireless device of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-7 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication, comprising:
    selecting, from a variable number of control fields, one or more control fields for inclusion in a frame;
    generating the frame comprising the selected number of control fields; and
    transmitting the frame,
    wherein each control field further comprises:
        a control identifier field; and
        a control information field, the control information field including information for communication, the control identifier field including an indicator indicating a type of the information,
    wherein the control identifier field indicates trigger information and wherein the control information field comprises a trigger information field.

2. The method of claim 1, wherein each control field further comprises a first field, the first field storing an indicator indicative of the control field comprising a variant of the control field.

3. The method of claim 2, wherein the variant comprises a high efficiency (HE) variant of a very high throughput (VHT) variant of the control field.

4. The method of claim 1, wherein the type of information comprises at least one of an acknowledgment, a not acknowledgement, a block acknowledgement request, a block acknowledgement, channel quality information, a modulation and coding scheme (MCS) feedback, a power save (PS) poll, and a cyclic redundancy check, wherein the control field indicates at least one of:
    a channel quality information and modulation and coding scheme (MCS) feedback and wherein the control information field comprises a control field, a channel bitmap field, a subchannel field and a feedback field, wherein the content of the feedback field is based on the channel/MCS indication field, and wherein the feedback field comprises a number of spatial streams field, a MCS field, a multi-user/coding field, and a signal-to-noise ratio (SNR) field,
    a request/response field, a dialog token field, a subchannel bitmap present field, and a channel/MCS indication field,
    a power save poll field, and
    a cyclic redundancy check (CRC) and wherein the control information field comprises a CRC field.

5. The method of claim 1, wherein generating the frame comprises generating the frame within a physical layer header portion of a physical layer convergence procedure (PLCP) protocol data unit (PPDU) frame, and wherein the physical layer header portion comprises one or more of a signal field, a long training field and a short training field.

6. The method of claim 1, wherein generating the frame comprises generating the frame within an aggregated media access control protocol data unit (A-MPDU) subframe containing the one or more control fields.

7. A method of wireless communication, comprising:
    selecting, from a variable number of control fields, one or more control fields for inclusion in a frame;
    generating the frame comprising the selected number of control fields; and
    transmitting the frame,
    wherein each control field further comprises:
        a control identifier field; and
        a control information field, the control information field including information for communication, the control identifier field including an indicator indicating a type of the information,
    wherein the control identifier field indicates a buffer status (BS) request or BS report and wherein the control information field comprises one or more subfields containing a report on buffer status information or a request for buffer status information.

8. The method of claim 7, wherein the control information field comprises a quality of service (QoS) control field, and wherein the QoS control field comprises a traffic identifier (TID) field indicating whether BS polling is per-TID or all-TID, a transmission opportunity field, and a queue size field.

9. The method of claim 1, wherein the trigger information field indicates subchannel information for a station or indicates a compressed or uncompressed uplink medium access control (MAC) format.

10. The method of claim 1, wherein the selected number of control fields comprises one or more first control fields addressed to a first device and one or more second control fields addressed to a second device.

11. The method of claim 10, wherein the one or more first control fields and the one or more second control fields are multiplexed in code, frequency, or time.

12. The method of claim 1, wherein transmitting the frame comprises transmitting the frame using an uplink multiple user physical layer convergence procedure (PLCP) protocol data unit (PPDU) frame.

13. The method of claim 1, wherein transmitting the frame comprises transmitting the frame using a downlink multiple user physical layer convergence procedure (PLCP) protocol data unit (PPDU) frame.

14. The method of claim 1, wherein the control identifier field indicates uplink (UL) multi-user (MU) response scheduling and wherein the control information field includes scheduling information for transmitting an UL physical layer convergence procedure (PLCP) protocol data unit (PPDU) frame including acknowledgement information.

15. The method of claim 14, wherein the control information field comprises a UL PPDU length field indicating a length of the UL PPDU frame and a resource allocation field indicating a resource unit assigned for transmitting the UL PPDU frame.

16. The method of claim 1, wherein the frame further comprises a padding field that follows the one or more control fields so that a length of the one or more control fields satisfies a length requirement or a boundary requirement.

17. The method of claim 16, wherein the length requirement is 30 bits and the boundary requirement is a multiple of octets.

18. The method of claim 1, wherein the frame comprises multiple-station block acknowledgement (BA) frame.

19. The method of claim 1, wherein the frame comprises a trigger frame.

20. The method of claim 19, wherein the frame comprises a value of an AID field indicating the presence of one or more control fields following that value of the AID field.

21. The method of claim 20, wherein the value of the AID field is 2047.

22. The method of claim 1, wherein the frame further comprise a per association identifier (AID) traffic identifier (TID) information field, the per AID TID information field indicating a presence of the selected number of control fields.

23. The method of claim 22, wherein the per AID TID information field comprises a type field indicating a number of bytes for the selected number of control fields.

24. The method of claim 22, wherein the per AID TID information field comprises a value of the TID subfield indicating the presence of one or more control fields for the STA identified by the AID subfield of the per AID TID Information field.

25. A device for communicating in a wireless network, the device comprising:
a processor configured to select, from a variable number of control fields, one or more control fields for inclusion in a frame, the processor further configured to generate the frame comprising the selected number of control fields; and
a transmitter configured to transmit the frame,
wherein each control field further comprises:
a control identifier field; and
a control information field, the control information field including information for communication, the control identifier field including an indicator indicating a type of the information,
wherein the control identifier field indicates trigger information and wherein the control information field comprises a trigger information field.

26. The device of claim 25, wherein each control field further comprises a first field, the first field storing an indicator indicative of the control field comprising a variant of the control field.

27. The device of claim 26, wherein the variant comprises a high efficiency (HE) variant of a very high throughput (VHT) variant of the control field.

28. The device of claim 1, wherein the type of information comprises at least one of an acknowledgment, a not acknowledgement, a block acknowledgement request, a block acknowledgement, channel quality information, a modulation and coding scheme (MCS) feedback, a power save (PS) poll, and a cyclic redundancy check, wherein the control field indicates at least one of:
a channel quality information and modulation and coding scheme (MCS) feedback and wherein the control information field comprises a control field, a channel bitmap field, a subchannel field and a feedback field, wherein the content of the feedback field is based on the channel/MCS indication field, and wherein the feedback field comprises a number of spatial streams field, a MCS field, a multi-user/coding field, and a signal-to-noise ratio (SNR) field,
a request/response field, a dialog token field, a subchannel bitmap present field, and a channel/MCS indication field,
a power save poll field, and
a cyclic redundancy check (CRC) and wherein the control information field comprises a CRC field.

29. The device of claim 25, wherein the processor is further configured to generate the frame within a physical layer header portion of a physical layer convergence procedure (PLCP) protocol data unit (PPDU) frame, and wherein the physical layer header portion comprises one or more of a signal field, a long training field and a short training field.

30. The device of claim 25, wherein the processor is further configured to generate the frame within an aggregated media access control protocol data unit (A-MPDU) subframe containing the one or more control fields.

31. A device for communicating in a wireless network, the device comprising:
a processor configured to select, from a variable number of control fields, one or more control fields for inclusion in a frame, the processor further configured to generate the frame comprising the selected number of control fields; and
a transmitter configured to transmit the frame,
wherein each control field further comprises:
a control identifier field; and
a control information field, the control information field including information for communication, the control identifier field including an indicator indicating a type of the information,
wherein the control identifier field indicates a buffer status (BS) request or BS report and wherein the control information field comprises one or more subfields containing a report on buffer status information or a request for buffer status information.

32. The device of claim 31, wherein the control information field comprises a quality of service (QoS) control field, and wherein the QoS control field comprises a traffic identifier (TID) field indicating whether BS polling is per-TID or all-TID, a transmission opportunity field, and a queue size field.

33. The device of claim 25, wherein the trigger information field indicates subchannel information for a station or indicates a compressed or uncompressed uplink medium access control (MAC) format.

34. The device of claim 25, wherein the selected number of control fields comprises one or more first control fields addressed to a first device and one or more second control fields addressed to a second device.

35. The device of claim 34, wherein the one or more first control fields and the one or more second control fields are multiplexed in code, frequency, or time.

36. The device of claim 25, wherein transmitting the frame comprises transmitting the frame using an uplink multiple user physical layer convergence procedure (PLCP) protocol data unit (PPDU) frame.

37. The device of claim 25, wherein transmitting the frame comprises transmitting the frame using a downlink multiple user physical layer convergence procedure (PLCP) protocol data unit (PPDU) frame.

38. The device of claim 25, wherein the control identifier field indicates uplink (UL) multi-user (MU) response scheduling and wherein the control information field includes scheduling information for transmitting an UL physical layer convergence procedure (PLCP) protocol data unit (PPDU) frame including acknowledgement information.

39. The device of claim 38, wherein the control information field comprises a UL PPDU length field indicating a length of the UL PPDU frame and a resource allocation field indicating a resource unit assigned for transmitting the UL PPDU frame.

40. The device of claim 25, wherein the frame further comprises a padding field that follows the one or more control fields so that a length of the one or more control fields satisfies a length requirement or a boundary requirement.

41. The device of claim 40, wherein the length requirement is 30 bits and the boundary requirement is a multiple of octets.

42. The device of claim 25, wherein the frame comprises multiple-station block acknowledgement (BA) frame.

43. The device of claim 25, wherein the frame comprises a trigger frame.

44. The device of claim 43, wherein the frame comprises a value of an AID field indicating the presence of one or more control fields following that value of the AID field.

45. The device of claim 44, wherein the value of the AID field is 2047.

46. The device of claim 25, wherein the frame further comprise a per association identifier (AID) traffic identifier (TID) information field, the per AID TID information field indicating a presence of the selected number of control fields.

47. The device of claim 46, wherein the per AID TID information field comprises a type field indicating a number of bytes for the selected number of control fields.

48. The device of claim 46, wherein the per AID TID information field comprises a value of the TID subfield indicating the presence of one or more control fields for the STA identified by the AID subfield of the per AID TID Information field.

49. A non-transitory computer readable storage medium comprising instructions that when executed cause a processor to perform a method of wireless communication, the method comprising:
selecting, from a variable number of control fields, one or more control fields for inclusion in a frame;
generating the frame comprising the selected number of control fields, each control field comprising an end of control field, the end of control field storing an indicator indicative of an end of the selected number of control fields or a presence of another control field in the frame; and
transmitting the frame,
wherein each control field further comprises:
a control identifier field; and
a control information field, the control information field including information for communication, the control identifier field including an indicator indicating a type of the information,
wherein the control identifier field indicates trigger information and wherein the control information field comprises a trigger information field.

* * * * *